US007072251B2

(12) United States Patent
Nakajima et al.

(10) Patent No.: US 7,072,251 B2
(45) Date of Patent: Jul. 4, 2006

(54) OPTICAL DISC HAVING PITS OF DIFFERENT DEPTH FORMED THEREIN, OPTICAL DISC DEVICE FOR REPRODUCING THE SAME, AND METHOD OF REPRODUCTION

(75) Inventors: Junsaku Nakajima, Kashihara (JP); Hitoshi Takeuchi, Kitakatsuragi-gun (JP); Masaru Nomura, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 10/671,239

(22) Filed: Sep. 24, 2003

(65) Prior Publication Data

US 2004/0057350 A1 Mar. 25, 2004

Related U.S. Application Data

(62) Division of application No. 09/606,282, filed on Jun. 29, 2000, now Pat. No. 6,760,299.

(30) Foreign Application Priority Data

Jun. 30, 1999 (JP) ................................ 11-184604
Jul. 14, 1999 (JP) ................................ 11-199708
Jul. 23, 1999 (JP) ................................ 11-208472

(51) Int. Cl.
*G11B 7/00* (2006.01)

(52) U.S. Cl. .............................. 369/44.26; 369/44.29; 369/44.41

(58) Field of Classification Search ..................... None
See application file for complete search history.

(56) References Cited

U.S. PATENT DOCUMENTS 4,980,877 A * 12/1990 Sugiyama et al. ....... 369/44.41
5,537,373 A 7/1996 Horikiri .................. 369/44.13
5,822,294 A * 10/1998 Ohtomo et al. .......... 369/275.4
6,181,657 B1 * 1/2001 Kuroda et al. .......... 369/44.41
6,226,257 B1 * 5/2001 Morimoto ............... 369/275.4

FOREIGN PATENT DOCUMENTS

JP 58-150145 9/1983
JP 58-215735 12/1983
JP 60-167129 8/1985
JP 60-242532 12/1985
JP 62-129944 6/1987
JP 62298935 A * 12/1987
JP 02-108244 4/1990
JP 05-205276 8/1993
JP 06-215380 8/1994
JP 07021588 A * 1/1995
JP 08-031015 2/1996
JP 11-66607 3/1999
JP 11-167733 6/1999

* cited by examiner

*Primary Examiner*—Thang V. Tran
(74) *Attorney, Agent, or Firm*—David G. Conlin; David A. Tucker; Edwards Angell Palmer & Dodge LLP

(57) ABSTRACT

On an optical disc including a substrate on which pits having at least two different depths are formed, main information is recorded by the shape of the pits and additional information is recorded by the depth of the pit. It is possible to reverse polarity of a tangential push-pull signal dependent on the depth of the pit, and therefore it becomes possible to record information utilizing the depth of the pit. This improves recording density of the optical disc. Further, when information of the optical disc is to be copied, the information recorded by the depth of the pit cannot be copied. Therefore, unauthorized reproduction can be prevented.

2 Claims, 19 Drawing Sheets

OPTICAL DISC HAVING PITS OF DIFFERENT DEPTH FORMED THEREIN, OPTICAL DISC DEVICE FOR REPRODUCING THE SAME, AND METHOD OF REPRODUCTION

This application is a Division of U.S. patent application Ser. No. 09/606,282, entitled OPTICAL DISC HAVING PITS OF DIFFERENT DEPTH FORMED THEREIN, OPTICAL DISC DEVICE FOR REPRODUCING THE SAME, AND METHOD OF REPRODUCTION, filed Jun. 29, 2000 now U.S. Pat. No. 6,760,299 by Nakajima, et al. (the same inventors as of this divisional application).

BACKGROUND OF THE INVENTION

1. Field of the Invention

The present invention relates to an optical disc on which information is recorded in advance by means of pits having recessed and protruded shapes formed partially or entirely over a recording surface. More specifically, the present invention provides a technique for increasing recording capacity, preventing reduction in the capacity of recording main information by utilizing the increased capacity for recording additional information and enabling effective use of the recorded additional information. More specifically, the present invention relates to an optical disc of which pit depth represents information, an optical disc device for reproduction of the same, and the method of reproduction.

2. Description of the Background Art

A conventional optical disc is for binary recording, in which binary data correspond to presence/absence of pits.

When density of the disc is to be increased, the size of the pit is made smaller, and a laser beam spot for reading the same is also made smaller. Besides, multi-value recording in which one pit represents multi-valued data is also an effective means to attain higher density.

Japanese Patent Laying-Open No. 58-215735, for example, proposes an optical disc enabling recording of multi-valued data by changing pit depth in a plurality of stages so that quantity of light reflected therefrom changes in multiple steps. In this method, however, it is difficult to determine the level of the reflected light quantity, resulting in increased errors in the reproduced data. Japanese Patent Laying-Open No. 5-205276, alternatively, discloses a method of reproducing multi-valued recorded data by combining the level of the reflected light quantity and a push-pull signal level.

In an optical disc on which information is recorded by forming recessed and protruded pits in advance, as currently represented by a CD (Compact Disc) or a DVD (Digital Versatile Disc), the information is recorded in accordance with the method referred to as pit length recording, in which the information is mainly represented by presence/absence of a pit and the length of the pit.

FIGS. 1A to 1C are illustrations related to reproduction of a conventional optical disc on which information is recorded in accordance with the pit length recording method.

Referring to FIG. 1A, when a light beam 1101 directed from a pick up, not shown, onto the optical disc comes to a pit 131, the quantity of reflected light varies as shown in FIG. 1B because of interference and diffraction phenomenon of the light caused by the pit. When the reflected light is condensed on a photodetector, taken out as an electric signal and binarized by the comparison with a prescribed reference voltage, a reproduction data such as shown in FIG. 1C is obtained. By detecting presence/absence as well as the length of pit 131 based on the data, it becomes possible to reproduce the information. This is the principal of reproducing information from the conventional optical disc on which recording is done by the pit length recording method.

A CD and a DVD are much different in capacity. The difference derives from the difference in density of tracks, which are string of pits, as well as the difference in size of the pits formed on the discs. Further, optical wavelength and NA (Numerical Aperture) of the objective lens used are also different. More specifically, for a CD, NA of the objective lens is about 0.4 and the laser wavelength is about 780 nm to about 830 nm, whereas for a DVD, NA is 0.6 and the laser wavelength is 650 nm. The difference in the optical system results in the difference of the light beam.

The information recorded on the optical disc may be classified into the information eventually required by the user, that is, main information, and additional information for enabling efficient reproduction of the main information and for improving reliability of the main information.

Sound, image and characters may be the main information. The additional information may include index information, navigation information or the like for efficient reproduction, superimposed characters for a motion picture, subvoice, error correction code for improving reliability of the main information and address information representing a position on a disc. Recently, information for preventing unauthorized copying and a technique referred to as an electronic water mark, embedding information for protection within the main information have been studied, as techniques for preventing unauthorized reproduction of the information on the optical disc, and these may also be considered as additional information.

Existence of such additional information tends to increase the ratio of the additional information to the total capacity of the optical disc. With the limited recording capacity of the optical disc, increase of the additional information means decrease of the main information. To solve this problem, it is necessary to increase the recording capacity by improving recording density of the optical disc.

In order to increase the surface recording density of the optical disc, however, it is necessary to form smaller pits with high density, and to change optical system of a pickup for reproduction to generate smaller optical beam spot, from the reasons as described with reference to the difference in capacities of the CD and the DVD.

Japanese Patent Laying-Open No. 11-66607, for example, discloses a related technique. In this technique, as shown in FIG. 1 or FIG. 3 of this laid-open application, general main information is recorded as high density pits P0 for the CD, and large and low density pits P1 enclosing a number of pits P0 are recorded superposed.

The information of the high density pits (main information) is reproduced by an optical beam spot having the diameter of about 2 μm directed from a CD reading optical head H0 shown in FIG. 2 of this application, while the information of low density (additional information) is reproduced by an optical beam having the diameter of about 500 μm directed from a low density reading optical head H1 having a larger spot diameter.

In the method disclosed by Japanese Patent Laying-Open No. 5-205276, it is necessary to provide a beam spot for obtaining a push-pull signal, separate from the beam spot to obtain the reflected quantity of light, namely, two beam spots are necessary. When it is to be implemented by only one beam spot, it becomes necessary to offset the beam spot from the center of the track, or to cause relative positional deviation between the beam and the center of the track, by wobbling the track.

Such approach does not ensure stable tracking control, and therefore it is prone to deviation from the track or error in reproduction.

The technique disclosed by Japanese Patent Laying-Open No. 11-66607 requires two different types of optical heads (pickups). This leads to increased manufacturing cost and a larger scale device. Further, control of an optical head (pickup) for reproducing the additional information is also necessary. As the additional information is formed as large pits, the amount of recordable additional information is limited, and therefore decrease in the recording capacity of the main information caused by recording of the additional information cannot be avoided.

Various tracking servo techniques for positioning an optical beam on a pit string have been proposed for an optical disc reproducing device for reproducing an optical disc on which information is recorded by pits having recessed and protruded shapes formed in advance on a disc surface. Japanese Patent Laying-Open No. 58-150145 discloses an example.

FIG. 2 is a block diagram of the tracking servo in accordance with a phase difference (time difference) method disclosed by Japanese Patent Laying-Open No. 58-150145.

According to the phase difference (time difference) method, the reflected light beam from the optical disc is received by a photodetector having four elements divided along the radial direction of the optical disc and along the tangential direction. A sum signal of outputs of those of the photodetector elements which are positioned at opposing corners is found, and phase difference (time difference) of the sum signal is detected for tracking. In FIG. 2, the light beam reflected from the disc is condensed and directed to photodetector 22. Respective elements of the photodetector output signals corresponding to the incident light quantity. Sum amplifiers 23-1 and 23-2 calculate sum signals between portions a and c as well as b and d, which are positioned at opposing corners, of photodetector 22, and output the resulting sum signals to comparators (comparing circuits) 25-1 and 25-2. Comparators 25-1 and 25-2 compare the output signals from sum amplifiers 23-1 and 23-2 with reference signals +Ref1 and +Ref2, respectively, and provides as an output, a binary signal as a result of comparison.

As the reflected light beam has been diffracted by the pits, intensity distribution of the reflected light on the photodetector varies with time, dependent on the positional relation between the optical beam and each pit.

When the optical beam follows immediately above the pit string, for example, the sum signal of the outputs of elements (a+c) and the sum signal of the output from elements (b+d) which elements are at the opposing corners of photodetector 22 above the pits vary in the same manner. Therefore, output signals from comparators 25-1 and 25-2 also change in the similar manner at the same timing. When the optical beam follows a position deviated from just above the pit string, there would be phase difference (time difference) corresponding to the amount of deviation between the sum signal of the outputs (a+c) and the sum signal of the outputs (b+d), and either one of the sum signals change first, dependent on the direction of deviation.

Therefore, the phase difference (time difference) between the output signals from comparators 25-1 and 25-2 is detected by a phase comparing circuit 27, and a pulse corresponding to the phase difference (time difference) is provided. The pulse is passed through LPFs (Low Pass Filters) 28-1 and 28-2 to extract low frequency components only, and the difference therebetween is calculated by a differential amplifier 29. In this manner, a tracking signal indicative of the direction and amount of deviation between the optical beam and the pit string can be obtained.

Another example of the technique for obtaining the tracking servo signal is a push-pull method.

In the push-pull method, difference in the quantity of light on an inner periphery and on an outer periphery of a reflected light beam divided along the tangential direction is found, and the resulted difference is used as the tracking signal. FIG. 3 shows an example of a block configuration for generating the tracking servo signal in accordance with the push-pull method.

When the light beam is directed to a pit string, the reflected light is diffracted by the pits, dependent on the positional relation between the beam and the pits. In the push-pull method, the reflected light is divided into two and detected at the inner peripheral side and outer peripheral side of the optical disc, and a tracking servo signal is generated based on an average intensity.

Referring to FIG. 3, the reflected light beam is condensed onto a four-split photodetector 22, as in the phase difference (time difference) method described above. Sum amplifiers 23-1 and 23-2 provide sum signals of the outputs from elements on the inner peripheral side and sum signals of the outputs from the elements positioned on the outer peripheral side, not from the elements at opposing corners of the photodetector. The result of addition is output to differential amplifier 37. Differential amplifier 37 provides the difference between the two signals from sum amplifiers 23-1 and 23-2 to LPF 38. LPF 38 removes high frequency component of each pit from the difference, and extracts the low frequency component, that is, signal component which corresponds to average deviation between the light beam and the pit string. In principle, in the push-pull method, this signal is used as the tracking servo signal.

This method, however, has a problem that dependent on the depth of the pit formed on the optical disc, the polarity of the tracking servo signal may be inverted.

SUMMARY OF THE INVENTION

An object of the present invention is to provide an optical disc capable of improving recording density without necessitating a new optical pickup and without increasing cost or size of the device and to-provide an optical disc device and method for reproducing the same.

Another object of the present invention is to provide an optical disc allowing recording of additional information without decreasing the amount of main information, to provide an optical disc device for reproduction and the method therefor.

A still further object of the present invention is to provide an optical disc capable of preventing unauthorized reproduction without reducing the amount of main information, an optical disc device for reproduction and the method therefor.

A still further object of the present invention is to provide an optical disc allowing de-scrambling and decipher and improving error correction capability without decreasing the amount of main information, an optical disc device reproducing the same and the method therefor.

A still further object of the present invention is to provide an optical disc device capable of correct tracking servo control of an optical disc of which recording density is improved.

According to an aspect, the present invention provides an optical disc having a substrate on which pits of at least two different depths are formed, wherein first and second pits are formed to satisfy the relations $0<D1<\lambda/4n$ and $\lambda/4n<D2<\lambda/2n$, where D1 represents the depth of the first pit, D2 represents the depth of the second pit, λ represents the wavelength of light used for reproduction of the optical disc and n represents an index of refraction of the optical disc substrate.

When the depth D1 of the first pit and depth D2 of the second pit are in the above described ranges, it becomes possible to invert polarity of the tangential push-pull signal at the first and second pits. This enables recording of information in accordance with the pit depth. Accordingly, recording density of the optical disc can be improved. When pit information of the optical disc is to be copied, the information in accordance with the pit depth cannot be copied on a recordable disc. Therefore, unauthorized reproduction can be avoided.

According to another aspect, the present invention provides an optical disc including a substrate on which pits having at least two different depths are formed, wherein the first and second pits are formed so that the depth D1 of the first pit and the depth D2 of the second pit satisfy the relations $(k\lambda/2n)<D1<\{(\lambda/4n)+(k\lambda/2n)\}$ and $\{(\lambda/4n)+(m\lambda/2n)\}<D2<\{(m+1)\cdot\lambda/2n\}$, where D1 represents the depth of the first pit, D2 represents the depth of the second pit, λ represents wavelength of the light used for reproducing the optical disc, n represents an index of refraction of the substrate of the optical disc, and k and m are arbitrarily integers.

By setting the depth D1 of the first pit and depth D2 of the second pit within the above described ranges, it becomes possible to invert the polarity of the tangential push-pull signal at the first and second pits, and hence it becomes possible to record information in accordance with the depth of the pit. This enables improved recording density of the optical disc.

According to a still further aspect, the present invention provides an optical disc including a substrate on which pits having at least two different depths are formed with the pit depth adjusted such that polarity of signals representing difference in intensity distribution of reflected light along the tangential direction of a pit string differ at a pit of a first depth and a pit of a second depth.

As the depths of the pits are adjusted such that the signals representing difference in intensity distribution of the reflected light along the tangential direction of the pit string differ, it becomes possible to record information in accordance with the depth of the pit. Therefore, recording density of the optical disc can be improved.

According to a still further aspect, the present invention provides an optical disc including a substrate on which pits having at least two different depths are formed, in which information is recorded based on signal polarity representing difference in intensity distribution of the reflected light along the tangential direction of a pit string, of the pits having at least two different depths.

As the information is recorded based on the polarity of a signal representing difference in intensity distribution of the reflected light along the tangential direction of the pit string, recording density of the optical disc can be improved.

According to a still another aspect, the present invention provides an optical disc including a substrate on which pits having at least two different depths are formed, wherein information is recorded by a combination of a signal coming from the amount of reflected light from the pits having at least two different depths and a signal representing difference in intensity distribution of the reflected light along the tangential direction of the pit string.

As the information is recorded by the combination of the signal coming from the amount of light reflected from the pits and the signal indicative of the difference in intensity distribution of the reflected light along the tangential direction of the bit string, it becomes possible to improve recording density of the optical disc.

According to a still further aspect, the present invention provides an optical disc including a substrate on which pits having at least two different depths are formed, in which main information is recorded in accordance with the shape of the pits and additional information is recorded in accordance with the depth of the pits.

As the additional information is recorded by the depth of the pits, it becomes possible to improve recording density of the optical disc. Further, when error correction information, a de-scrambling key, a decipher key or the like is recorded as additional information, it becomes possible to improve error correction capability, to de-scramble or to decipher.

According to a still further aspect, an optical disc reproducing device includes a first detecting unit detecting a first signal based on an amount of light reflected from an optical disc, a second detecting unit detecting a second signal representing difference in intensity distribution of the reflected light along the tangential direction of a pit string on the optical disc, and a reproducing unit reproducing information recorded on the optical disc based on the first signal detected by the first detecting unit and the second signal detected by the second detecting unit.

The reproducing unit reproduces the information recorded on the optical disc based on the first and second signals. Therefore, the amount of information to be reproduced can be increased as compared with reproduction of information only from the first signal. Therefore, it becomes possible to reproduce the optical disc having improved recording density.

According to a still further aspect, the optical disc reproducing device in accordance with the present invention includes a main information reproducing unit reproducing main information from the light reflected from the pits formed on a substrate of an optical disc, and an additional information reproducing unit reproducing additional information by detecting depth of the pits.

The additional information reproducing unit reproduces the additional information by detecting the pit depth. Therefore, it becomes possible to reproduce additional information recorded on the optical disc on which recording density is improved by the depth of the pit.

According to a still further aspect, the method of reproduction in accordance with the present invention includes the steps of detecting a first signal based on an amount of light reflected from an optical disc, detecting a second signal representing difference in intensity distribution of the reflected light along the tangential direction of a pit string on the optical disc, reproducing main information recorded on the optical disc based on the detected first signal, and reproducing additional information recorded on the optical disc based on the detected second signal.

As the information recorded on the optical disc is reproduced based on the first and second signals, the amount of information to be reproduced can be increased as compared with reproduction of information only by the first signal. Therefore, it becomes possible to reproduce an optical disc having improved recording density.

According to a still further aspect, an optical disc reproducing device in accordance with the present invention reproduces an optical disc on which pits having at least two different depths are formed, and the device includes a photoreceptor detecting light reflected from the optical disc, a pit depth detecting unit detecting the depth of the pit formed on the optical disc based on the amount of reflected light detected by the photoreceptor, a servo signal generating unit generating a tracking servo signal based on the amount of reflected light detected by the photoreceptor, and a polarity inverting unit for inverting polarity of the tracking servo signal generated by the servo signal generating unit, based on the result of detection by the pit depth detecting unit.

As the polarity inverting unit inverts polarity of the tracking servo signal generated by the servo signal generating unit based on the result of detection by the pit depth detecting unit, correct tracking servo control is possible even for an optical disc on which recording density is improved by the depth of the pits.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Specific embodiments of the present invention will be described in detail in the following, with reference to the figures.

Using an optical system including a laser beam having the wavelength of 650 nm and a lens having NA of 0.6, an experiment was performed on a disc having the track pitch of 0.74 μm and pits of various depths.

Polycarbonate having an index of refraction of 1.5 was used as a disc substrate, and Al was used as a reflective film. A disc having pits of two different depths was fabricated by the method described in U.S. Pat. No. 5,246,531 or the method described in Canadian Patent No. 2062840. Differential Phase Detection (DPD) method was used for tracking, with the beam spot running over the center of the track.

FIRST EMBODIMENT

A first embodiment of the present invention will be described with reference to FIGS. 4 to 8.

Figure 4:
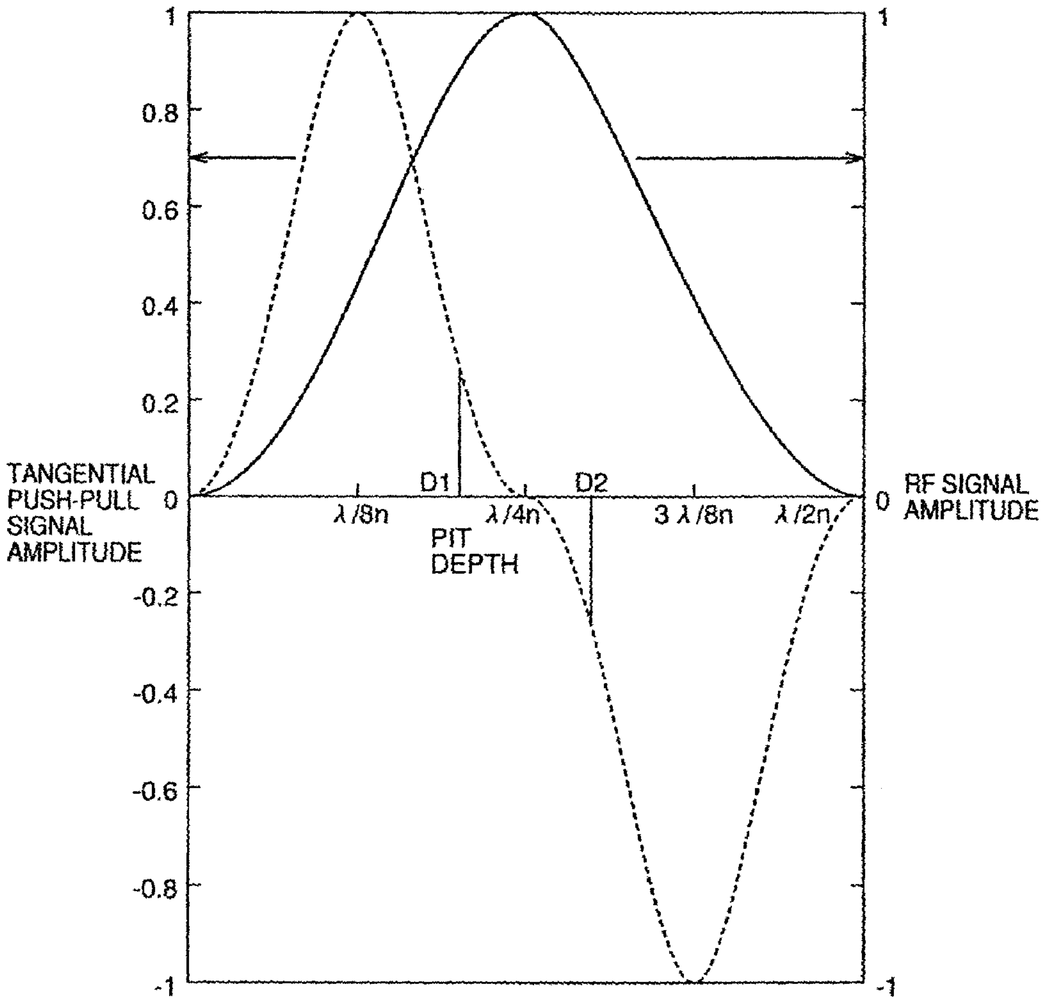
FIG. 4 is a graph representing relations between the pit depth, amplitude of tangential push-pull signal, and amplitude of an RF signal.

FIG. 4 represents the relation between each of pit depth, amplitude of a tangential push-pull signal and an amplitude of an RF signal. The abscissa represents pit depth, represented with the wavelength of the use light beam used as a reference. In this experiment, $\lambda/8n=54$ nm, $\lambda/4n=108$ nm, $3\lambda/8n=162$ nm, and $\lambda/2n=216$ nm. Here, $\lambda$ represents wavelength of the light beam and n represents the index of refraction of the optical disc.

The amplitude of the RF signal assumes the maximum value when the pit depth is $\lambda/4n$, and the ordinate on the right side of FIG. 4 is normalized using this value as 1. The amplitude of the tangential push-pull (TPP) signal assumes the maximum value when the pit depth is $\lambda/8n$, and the ordinate on the left side of FIG. 4 is normalized using this value as 1.

TPP signal has its polarity inverted with the pit depth of $\lambda/4n$ being the turning point. To represent this, in FIG. 4, the value of TPP is shown negative in the range where $\lambda/4n<$pit depth$<\lambda/2n$.

Figure 5A:
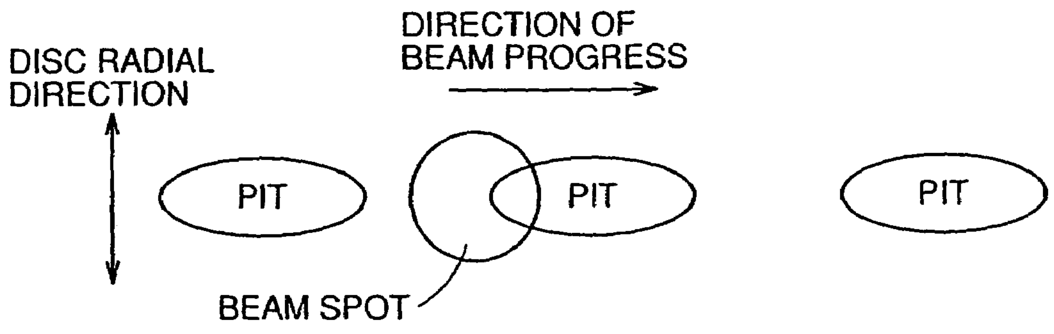
FIG. 5A is an illustration showing a beam spot running over pits.
Figure 5B:
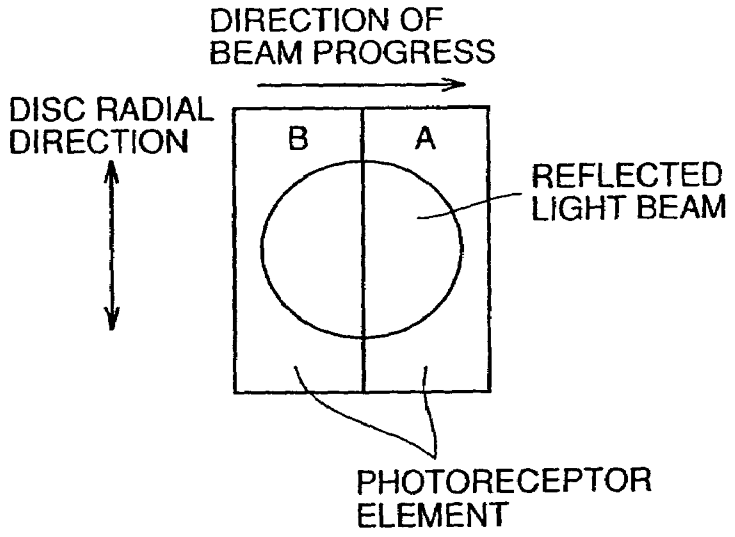
FIG. 5B represents the light reflected from the optical disc guided to a photoreceptor.
Figure 6:
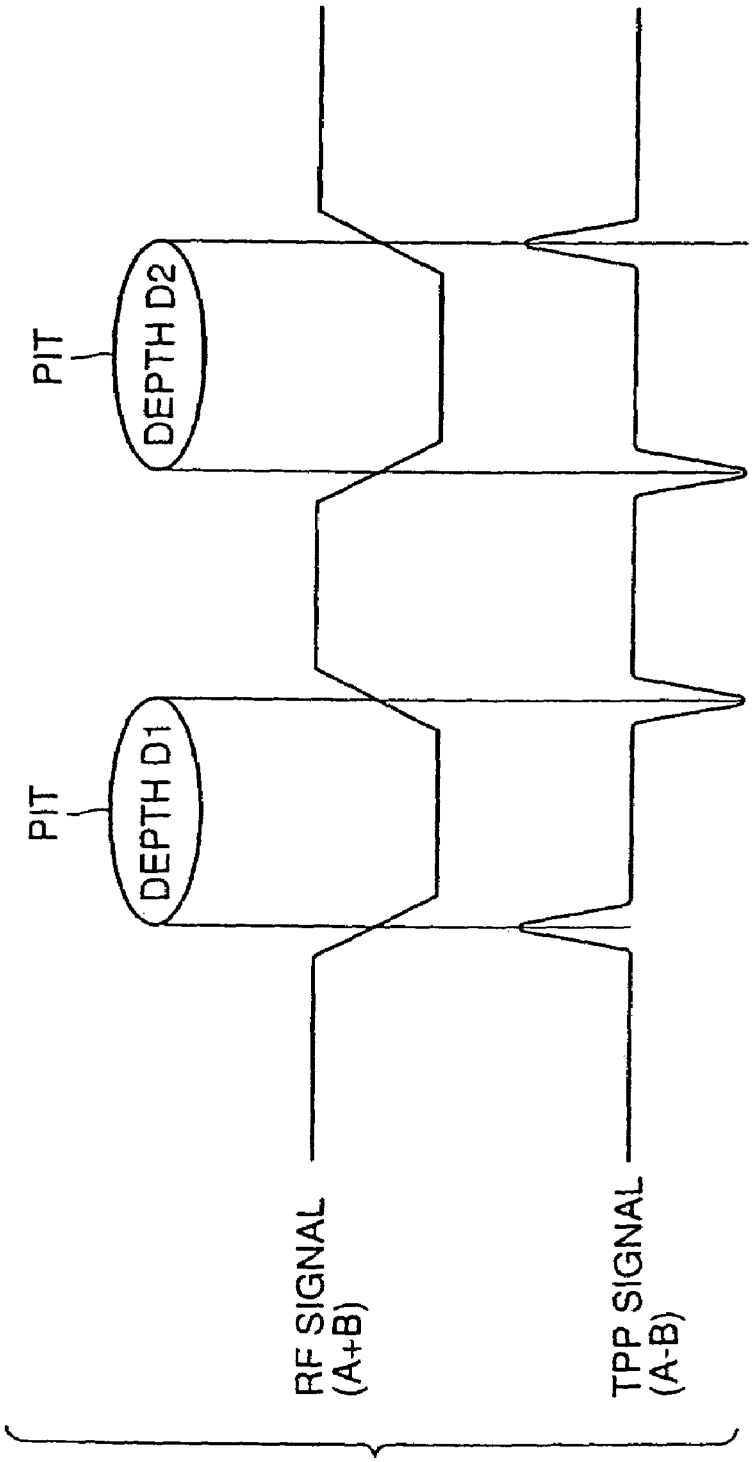
FIG. 6 shows a relation between a pit depth and RF and TPP signals.

The TPP signal and the RF signal will be described with reference to FIGS. 5A to 6. FIG. 5A shows the beam spot running over the pits. FIG. 5B represents a manner how the reflected light beam is guided to a detector consisting of half-split photoreceptors A and B. The TPP signal and the RF signal can be obtained in accordance with the following equations, using the outputs of the half-split photoreceptors A and B.

$$TPP=A-B$$

$$RF=A+B$$

Referring to FIG. 4, pits having the depths as represented by D1 (80 nm) and D2 (135 nm) were formed, and how the corresponding RF signal and the TPP signal appear will be described with reference to FIG. 6.

Here λ=650 nm and n=1.5, and therefor it holds that D1<λ/4n and λ/4n<D2.

The RF signal is a total sum signal of the quantity of light returning to photoreceptors A and B, when the beam spot is directed to the optical disc. When the beam spot is positioned on a pit, the light is influenced by the reflection by the pit, and the quantity of light returning to the photoreceptors (which may in other words be referred to as quantity of reflected light) decreases, and therefore the level of the RF signal lowers.

The TPP signal represents bias in the quantity of light along the direction of the length of the pit (tangential direction) of the reflected light beam, when the beam spot is directed to the optical disc. When the beam spot comes to an edge of a pit, the direction of diffraction is biased along the length direction of the pit, and the direction of the bias differ dependent on whether the edge is the leading or the trailing edge of the pit. Therefore, when the difference between the outputs of photoreceptors A and B is calculated, pulse-shaped signals having different polarities at leading and trailing edges of the pit can be obtained.

It should be noted, however, that which polarity the signal has at the leading and trailing edges of the pit depends also on the pit depth. At the pit having the depth D1 satisfying the above described conditions, the signal in the positive direction appears at the leading edge and the signal in the negative direction appears at the trailing edge of the pit, while at a pit having the depth D2, polarities are reversed.

In this manner, how the signals appear at the leading and trailing edges of the pit are reversed for D1 and D2, and in FIG. 4, this is expressed as "the tangential push-pull signal has different polarity."

Again referring to FIG. 4, both in the pits having the depths D1 and D2 satisfying the above described conditions, absolute values of the amplitudes of RF and TPP signals are almost equal, and only the polarity of TPP signal differs.

In the following, the method of reproducing multi-valued data using the RF and TPP signals and the configuration of the main portion of a device therefor will be described.

Figure 7:
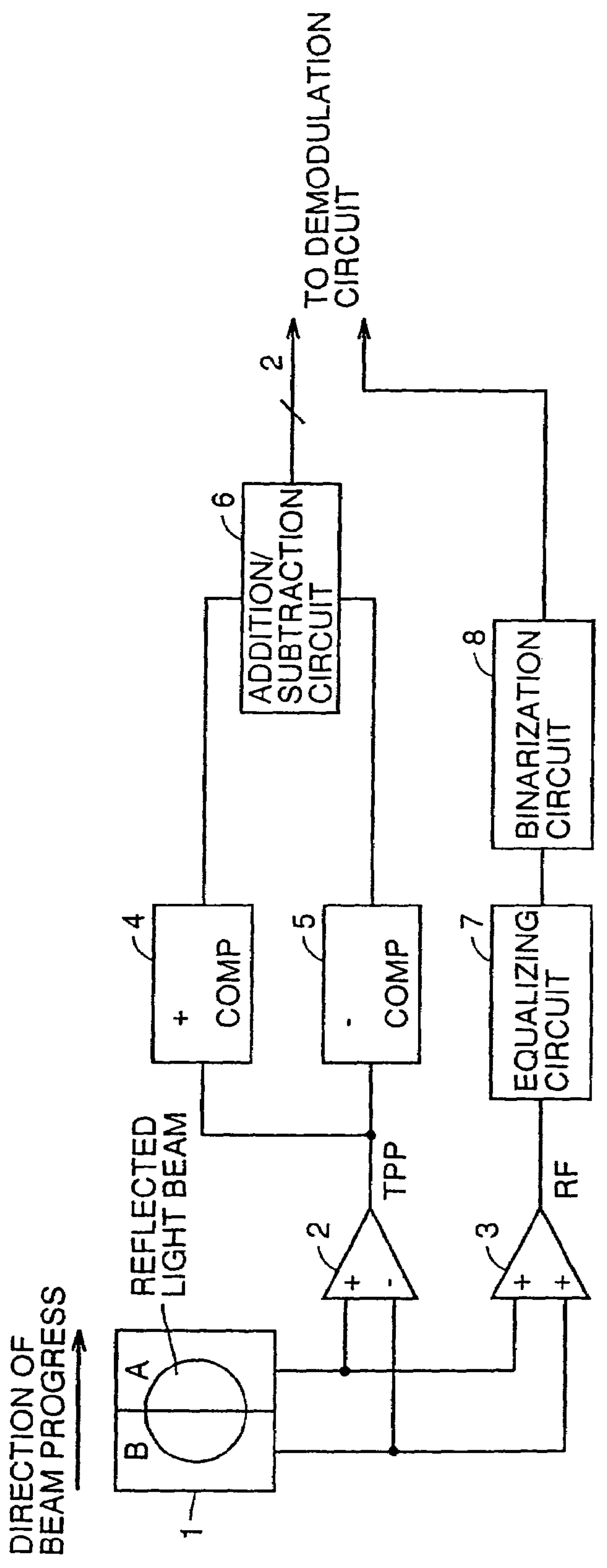
FIG. 7 is a block diagram showing a circuit configuration of a main portion of an optical disc reproducing device in accordance with the first embodiment of the present invention.

FIG. 7 is a block diagram representing a configuration of a main portion of the reproducing device. FIGS. 8A to 8G are illustrations showing the method and operation of reproduction, as well as waveforms and timings at that time. As can be seen from FIG. 7, the optical disc reproducing device includes a detector 1, a differential amplifier 2, a sum amplifier 3, comparators 4 and 5, an addition/subtraction circuit 6, an equalizing circuit 7 and a binarization circuit 8.

Figures 8A, 8B, 8C, 8D, 8E, 8F, 8G:
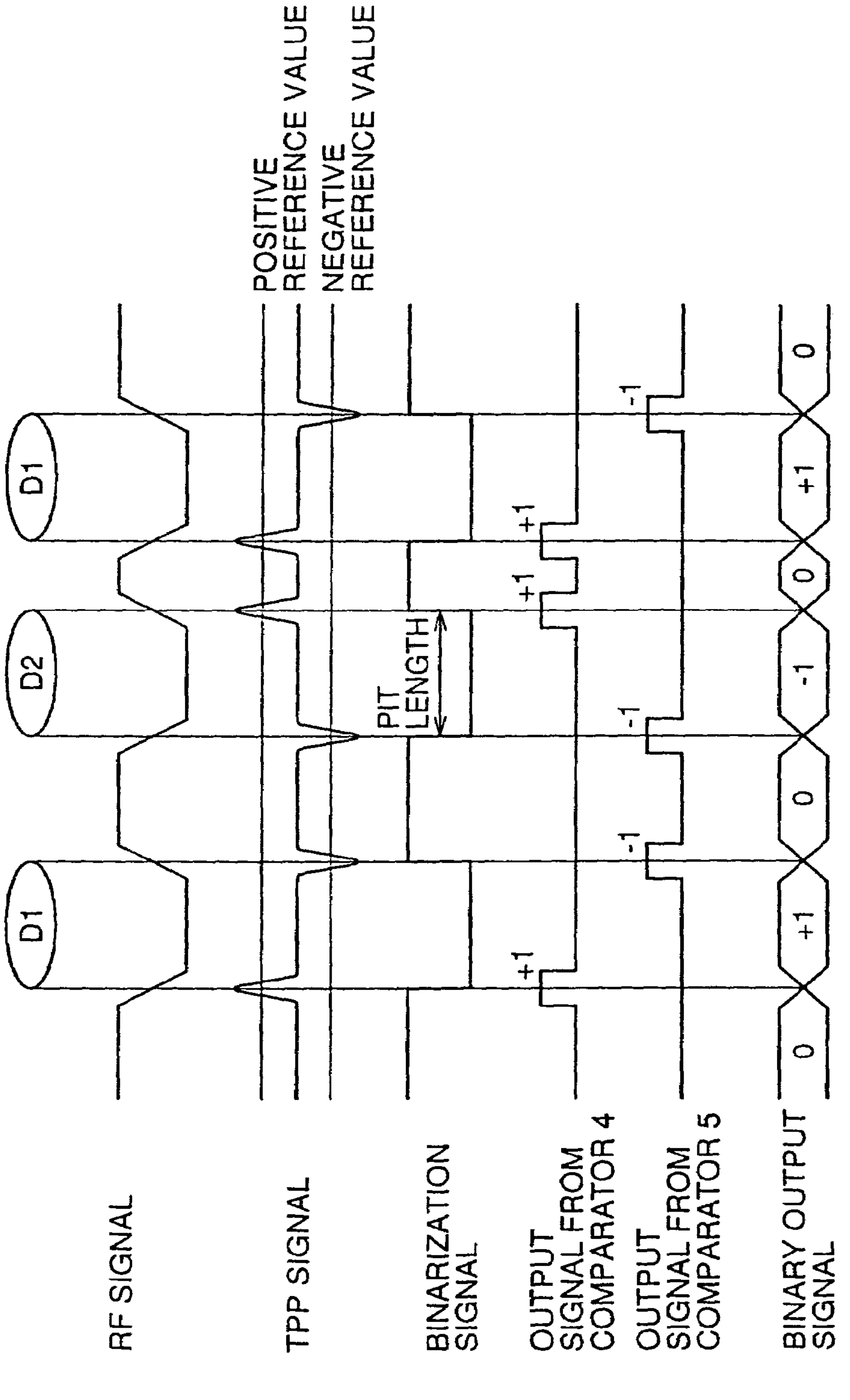
FIGS. 8A to 8G are timing charts of an internal circuit of the optical disc reproducing device in accordance with the first embodiment of the present invention.

First, let us consider reproduction of pits arranged in the manner as shown in FIG. 8A. In FIG. 8A, it is assumed that the pits have the depths of D1, D2 and D1 from the left. Difference between outputs of detector 1 including photoreceptors A and B is calculated by differential amplifier 2 and output as a TPP signal (FIG. 8C). A sum of the outputs is calculated by sum amplifier 3 and provided as the RF signal (FIG. 8B).

The RF signal has its frequency characteristic and the like corrected for a reproduction signal from a particularly short pit by equalizing circuit 7, binarized by binarization circuit 8 (FIG. 8D), and output to a demodulation circuit, not shown.

The TPP signal is compared by a positive reference value by comparator 4, and when it is larger than the reference value (having a positive sign and larger absolute value), a pulse (+1) is output to addition/subtraction circuit 6. Similarly, the signal is compared with a negative reference value by comparator 5, and when it is smaller than a negative reference value (having negative sign and large absolute value), a pulse (−1) is output to addition/subtraction circuit 6 (FIG. 8F). Addition/subtraction circuit 6 adds pulses from comparators 4 and 5, and outputs an output signal of 2 bits (FIG. 8G) representing three states, that is, −1, 0 and +1, to the demodulation circuit.

More specifically, addition/subtraction circuit 6 operates (in this example, addition, including the signs) the two sets of pulse signals generated by binarizing TPP signals by comparators 4 and 5. Using the result of addition and subtraction, it becomes possible at the pit portion to recover and reproduce two states of −1 and +1 dependent on the pit depth (in other words, the order of appearance of positive and negative pulses on the tangential push-pull signal). Further, at a non-pit portion where there is no pit, the state of 0 can be recovered. Therefore, based on the presence/absence and the depth of the pit, reproduction of recorded information having a total of three values is possible. Therefore, as compared with the conventional binary recording, recording density of the information on the optical disc can significantly be improved.

Here, in order to reproduce recorded information in the similar manner as the conventional binary recording and reproduction, what is necessary is to have the depths of the pits to be the same. Referring to FIGS. 8A to 8G, when a beam spot comes to a leading edge of a pit having the depth D1, the tangential push-pull signal (TPP signal) appears as a positive signal (FIG. 8C) and at the trailing edge, it appears as a negative signal. Therefore, when the pulses shown in FIGS. 8E and 8F are added including the signs, the state of +1 is obtained at the pit portion and the state of 0 is obtained at the non-pit portion.

In other words, it is possible by the method of reproducing recording information or the optical disc reproducing device in accordance with the present invention to recover and reproduce binary information from a conventional optical disc having binary recording with the pits of the same depth, and to recover and reproduce three-valued information from a new optical disc having pits of different depths. Therefore, the method and the device of the present invention are compatible with the conventional optical disc having binary recording.

As described above, for multi-value recording by the combination of the RF and TPP signals, what is necessary is to form pits having two different depths D1 and D2 with the depth λ/4n at which the polarity of the TPP signal is reversed in between, on the optical disc. As to the conditions for D1 and D2, the following relations should be satisfied, as can be seen from FIG. 4.

$$0<D1<\lambda/4n \text{ and } \lambda/4n<D2<\lambda/2n.$$

Further, it can be read from FIG. 4 that both the RF and the TPP signals can be obtained with satisfactory balance and large amplitudes when the ranges of D1 and D2 are further limited to $$\lambda/8n<D1<\lambda/4n \text{ and } \lambda/4n<D2<3\ \lambda/8n.$$

More specifically, as the signals having larger amplitudes are obtained, the quality of the signals can be improved and the error in reproducing the recorded information can be reduced.

As already described, reproduction of binary information is possible from an optical disc having a constant pit depth of the prior art. When the optical disc having the pit depths set in the above described manner is used, reproduction of three-valued information is possible based on the depth of the pit. When the depth is further limited, both the RF and the TPP signals can be obtained with good balance and large amplitudes. Therefore, conveniently, the quality of the signal is further improved and the error in reproducing the information is reduced.

As described above, in the optical disc in accordance with the first embodiment of the present invention, information is recorded on the optical disc by pits of two different depths. Therefore, it becomes possible to record information in three values, and to increase recording density and recording capacity as compared with the conventional optical disc.

Further, the two different depths D1 and D2 of the pits are determined to satisfy $0<D1<\lambda/4n$ and $\lambda/4n<D2<\lambda/2n$, where λ represents the wavelength of the light and n represents the index of refraction of the substrate of the optical disc, it becomes possible to detect the pit depth dependent on the difference in polarity of the tangential push-pull signal, and recording of information by three values becomes possible.

Further, when the depths D1 and D2 of the pits are selected to satisfy $\lambda/8n<D1<\lambda/4n$ and $\lambda/4n<D2<3\lambda/8n$, the RF and the TPP signals can be obtained with well balanced amplitudes, so that signal quality at the time of reproduction is improved and the error in reproduction can be reduced.

In the optical disc reproducing device in accordance with the present embodiment, polarity of the TPP signal is detected and by addition and subtraction based on the polarity, information is reproduced. Therefore, it becomes possible by a simple circuit configuration to reproduce three-valued information recorded on the optical disc.

SECOND EMBODIMENT

In the first embodiment described above, two sets of binary signals in accordance with the positive/negative polarities of the tangential push-pull signal (TPP signal) are generated, and the recorded information is reproduced based on the result of addition/subtraction. The information on the same optical disc may be produced as well by other method and configuration.

Referring to FIGS. 8A to 8G, note the relation between the binarized signal (FIG. 8D) of the RF signal and the binarized signals (FIGS. 8E and 8F) obtained by binarizing the TPP signal (FIG. 8C) using positive and negative reference values. At a point of change of the binarized RF signal, the timing of appearance of the pulse for the output signal from comparator 4 or the output signal from comparator 5 is almost the same, and assuming the following, it is understood that the same reproduction information as in the first embodiment can be obtained:

(1) When a pulse appears on the output signal of comparator 4 (FIG. 8E) at a fall of the binarized signal (FIG. 8D), the reproduced information is +1, (2) When a pulse appears on the output signal of comparator 5 (FIG. 8F) at a fall of the binarized signal (FIG. 8D), the reproduced information is −1, and (3) At a rise of the binarized signal (FIG. 8D), the reproduction information is always 0.

Figure 9:
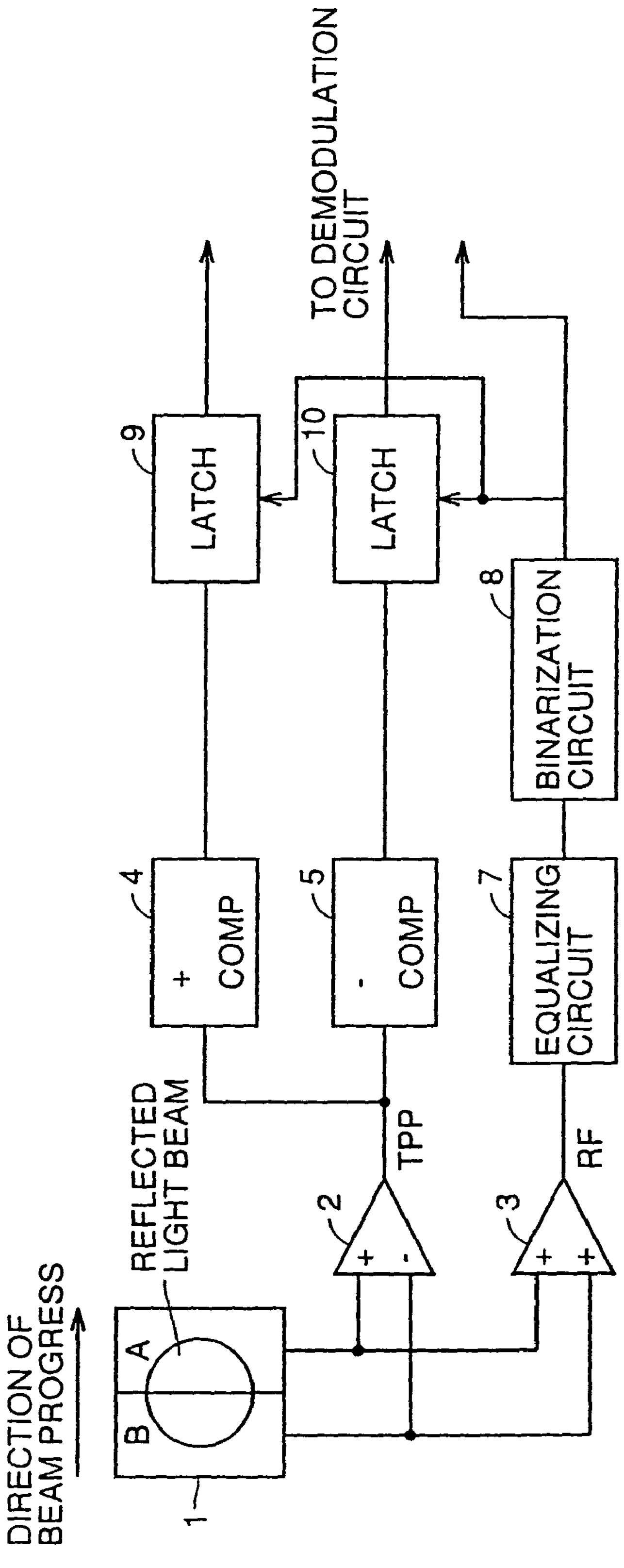
FIG. 9 is a block diagram showing a circuit configuration of a main portion of an optical disc reproducing apparatus in accordance with a second embodiment of the present invention.

FIG. 9 shows a configuration of the main portion of an optical disc reproducing device for reproducing the same information in accordance with this method and idea.

The configuration of the optical disc reproducing device in accordance with the present embodiment is almost the same as that of the first embodiment shown in FIG. 7, except that latches 9 and 10 are provided in place of addition/subtraction circuit 6. Latches 9 and 10 receive as inputs the pulses output from comparators 4 and 5 (FIGS. 8E and 8F). Latches 9 and 10 latch these inputs and outputs, at a fall of the signal obtained by binarizing the RF signal (FIG. 8C). Latches 9 and 10 are adapted such that the latches are cleared and output 0 at a rise, regardless of these inputs.

Outputs of the latches 9 and 10 are applied to a demodulation circuit, not shown, together with the binarized RF signal (output from binarization circuit 8). The demodulation circuit determines that the reproduced information is +1 when the output of latch 9 is 1, the reproduced information, is −1 when the output of latch 10 is 1 and the reproduced information is 0 when the outputs of latches 9 and 10 are both 0.

In the second embodiment also, the pit depths of the optical disc used described in accordance with the first embodiment are suitable, and the effects can also be obtained in the similar manner.

In the present embodiment, an optical system having the wavelength of 650 nm and NA of 0.6 has been used. The effect of the present invention, however, is apparently not limited by the optical system. Further, the values of the pit depths are not limited to those described in the embodiments above. It is unnecessary to say that various combinations of the values are possible within the scope as specified in the claims, within the spirit and scope of the present invention.

As described above, in the optical disc reproducing device in accordance with the second embodiment, the signal obtained by binarizing the TPP signal is latched at a fall of a signal obtained by binarizing the RF signal, by the latch circuit, and an output of the latch is cleared at a rise of the signal obtained by binarizing the RF signal. Therefore, reproduction of three-valued information recorded on the optical disc by a simple circuit configuration becomes possible.

THIRD EMBODIMENT

The third embodiment of the present invention will be described with reference to FIGS. 10 to 13.

Figures 1A, 1B, 1C:
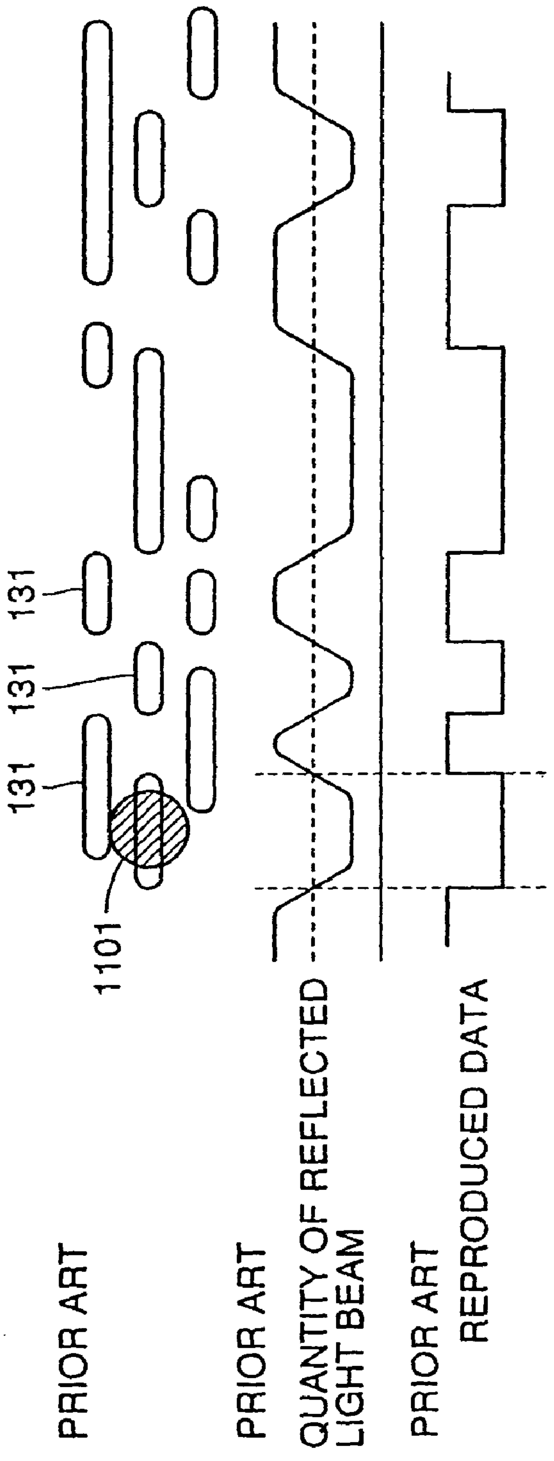
FIGS. 1A to 1C are illustrations representing reproduction of a conventional optical disc on which information is recorded by the pit depth recording method.
Figure 2:
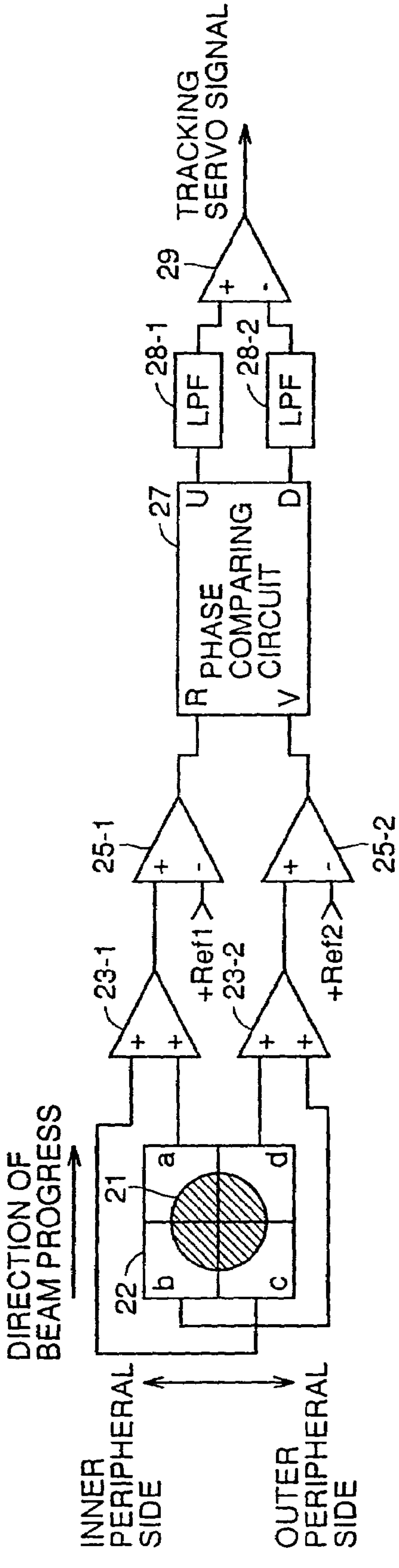
FIG. 2 is a block diagram showing a schematic configuration of a conventional tracking servo signal generating circuit in accordance with the phase difference method.
Figure 3:
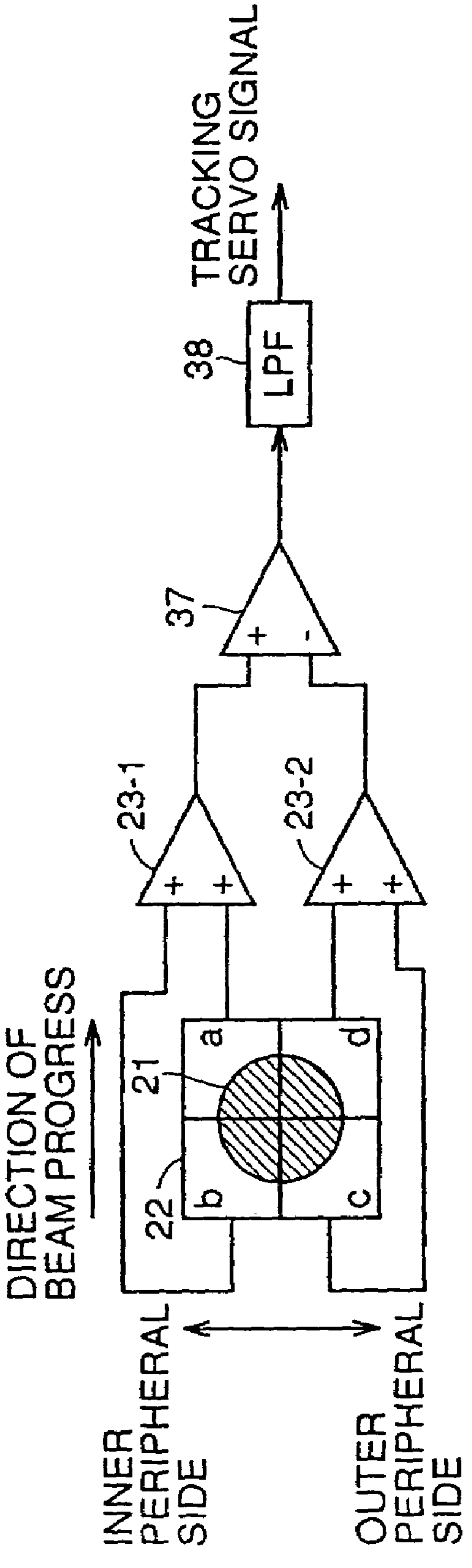
FIG. 3 is a block diagram representing a schematic configuration of a tracking servo signal generating circuit in accordance with the push-pull method.

The principle of reproduction of the information in accordance with the present embodiment is somewhat different from the conventional principle of reproduction described with reference to FIGS. 1A to 1C. Therefore, the principle will be described first.

Figure 10:
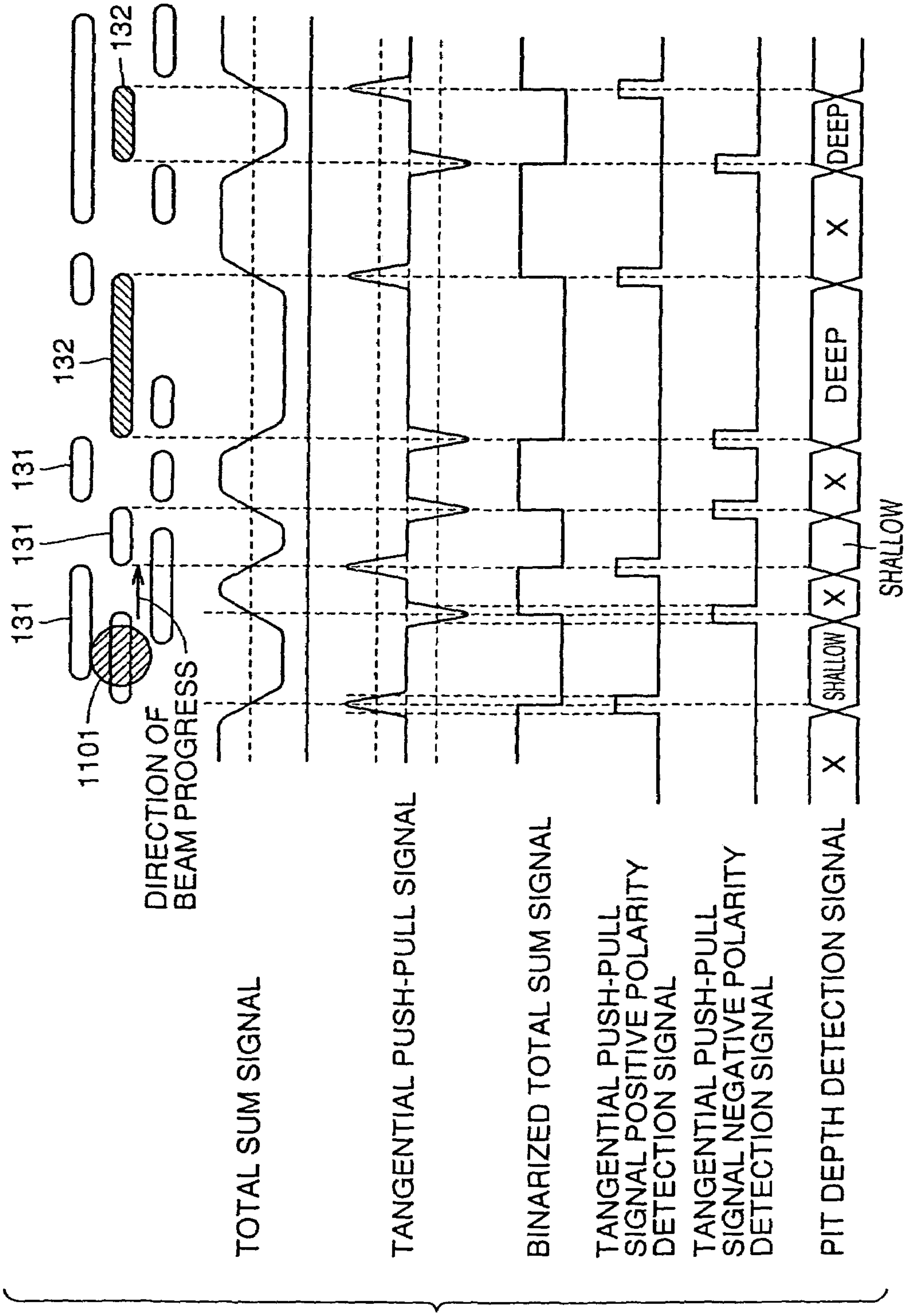
FIG. 10 is an illustration representing the principle of reproduction of the recorded information in accordance with a third embodiment of the present invention.

FIG. 10 shows the basic principle of reproducing information in accordance with the present invention. In the present invention, by varying the depth of the pits having recessed and protruded shapes formed on the optical disc, not only the length but also the depth of the pits come to have information. Particularly, the depth is classified into two, that is, shallow and deep.

Referring to FIG. 10, a pit 131 is a relatively shallow pit of which depth is about (λ/6n) and a hatched pit 132 is a relatively deep pit having the depth of about (λ/3n) where λ represents the wavelength of the light beam used and n represents the index of refraction of the optical disc substrate, and the respective depths are selected to satisfy the following relations:

$$0<(\text{depth of pit } 131)<\lambda/4n \text{ and}$$

$$\lambda/4n<(\text{depth of pit } 132)<\lambda/2n.$$

When the string of these pits is scanned by a light beam 1101 along the direction of the arrow of FIG. 10, light interference occurs at the pits as already described with reference to FIGS. 1A to 1C, and the quantity of reflected light varies. Therefore, the total sum signal of the quantity of light incident to the photodetector represents level change dependent on presence/absence of the pit. By binarization of this change, binarized total sum signal is obtained. The length of the pit can be determined by the binarized total sum signal. This is completely the same as the principle of reproduction of the conventional optical disc described with reference to FIGS. 1A to 1C.

Now let us consider the tangential push-pull signal, which is the signal representing difference in quantity of light of former and latter halves along the direction of progress of the light beam, of the light incident on photodetector 1 (that is, the light reflected from the optical disc). When a light beam comes to or goes out from a pit, only the former half or latter half of the optical beam is positioned on the pit. Therefore, intensity distribution of the reflected light differs along the direction of progress. Therefore, a pulse-shaped signal appears as the tangential push-pull signal representing the difference at a moment when the light beam comes to a pit or goes out from the pit, that is, at an edge of the pit.

Polarity of the tangential push-pull signal fluctuates by some factors, one of which is the pit depth. For convenience, in FIG. 10, it is assumed that a positive pulse is generated at a leading edge (the moment when the light beam 1101 comes to the pit) and the negative pulse is generated at a trailing edge (the moment when light beam 1101 goes out from the pit) for the shallow pit 131, and that a negative pulse is generated at the leading edge and that positive pulse is generated at the trailing edge of the deep pit 132.

This phenomenon occurs because of interference of reflected light caused by the pit or inversion of diffraction pattern dependent on the depth of pits 131 and 132. It may be described that the tangential push-pull signal has its polarity reversed dependent on the depths of pits 131 and 132.

By detecting the polarity of the tangential push-pull signal, it becomes possible to detect the depth of the pit. In other words, it becomes possible to represent information by the depth of the pit.

When the tangential push-pull signal is compared with positive and negative reference values, a tangential push-pull signal positive polarity detecting signal is generated when a prescribed positive level is exceeded and a tangential push-pull signal negative polarity detection signal is generated when an absolute value in the negative direction exceeded a prescribed level, and a pit depth detecting signal can be obtained by combining the positive polarity and the negative polarity detecting signals with the binarized total sum signal. More specifically, when a pulse appears on the tangential push-pull signal positive polarity detecting signal at a fall of the binarized total sum signal and a pulse appears on the tangential push-pull signal negative polarity detecting signal at a rise of the binarized total sum signal, then the pit is shallow, and if the pulse appearance timings are reversed, the pit is determined to be deep.

Figure 11:
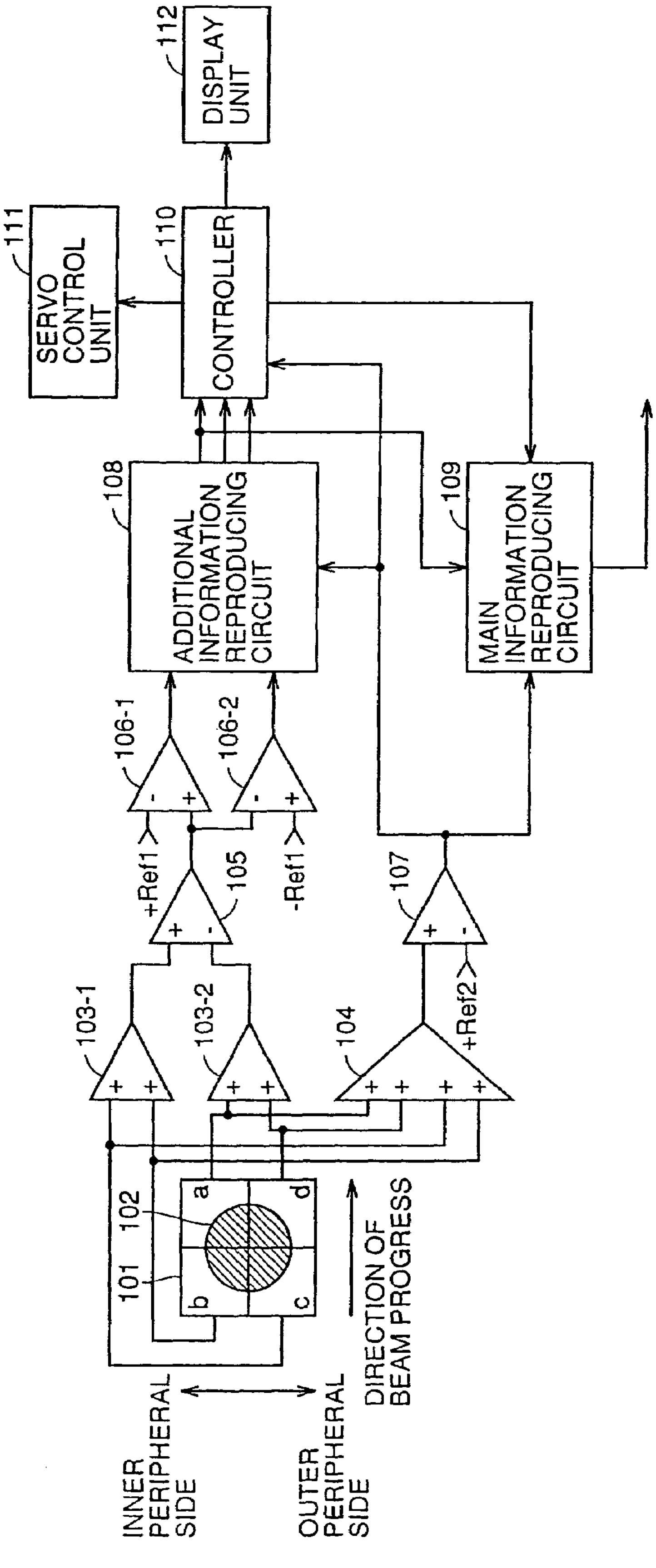
FIG. 11 is a block diagram showing a circuit configuration of a main portion of an optical disc reproducing device in accordance with the third embodiment of the present invention.

FIG. 11 is a block diagram representing an example of a configuration of the portion reproducing the main information and the additional information of the optical disc reproducing device in accordance with the present embodiment. The optical disc reproducing device includes a photodetector 102, sum amplifiers 103-1, 103-2 and 104, a differential amplifier 105, comparators 106-1, 106-2 and 107, an additional information reproducing unit 108, a main information reproducing unit 109, a controller 110, a servo control unit 111 and a display unit 112.

Referring to FIG. 11, the reflected light 101 from the optical disc is condensed on the center of photodetector 102. Photodetector 102 is divided into four elements a, b, c and d along a dividing line in the tangential direction of the pit string and along the dividing line along the radial direction of the optical disc. Each element outputs a signal which is in proportion to the quantity of light incident thereon. Sum amplifier 103-1 outputs a sum signal (b+c) of the elements b and c positioned rearward with respect to the direction of progress of the beam, and sum amplifier 103-2 outputs a sum signal (a+d) of elements a and d positioned forward with respect to the direction of progress of the beam. Sum amplifier 104 outputs a total sum (a+b+c+d) of the four elements.

Outputs from sum amplifiers 103-1 and 103-2 are input to differential amplifier 105, and the result is provided as the tangential push-pull signal representing the difference in intensity distribution between the former and latter halves of the reflected light, that is, along the tangential direction of the pit string, which signal is input to comparators 106-1 and 106-2. Comparators 106-1 and 106-2 compare the tangential push-pull signal with predetermined reference voltages +Ref1 and −Ref1, respectively. When the amplitude of the tangential push-pull signal is larger than +Ref1, comparator 106-1 outputs "H", and when the amplitude of the tangential push-pull signal has larger absolute value in negative direction than −Ref1, comparator 106-2 outputs "H", to additional information reproducing circuit 108. The output from sum amplifier 104 is compared with a reference voltage +Ref2 by comparator 107, and the resulting binary signal is output to main information reproducing circuit 109, additional information reproducing circuit 108, and to controller 110 controlling the operation of the optical disc device.

Controller 110 controls main information reproducing circuit 109, servo control unit 111, display unit 112 and so on.

As described above, the tangential push-pull signal is inverted dependent on the depth of the pit. In such a circuit configuration in that the tangential push-pull signal provides a positive pulse at a leading edge and a negative pulse at a trailing edge of a shallow pit, when a deep pit is reproduced, it is the case that the tangential push-pull signal provides a negative pulse at a leading edge and a positive pulse at the trailing edge of the pit. Based on this principle, additional information reproducing circuit 108 detects the depth of the pit and reproduces the information recorded by the depth.

Figure 12:
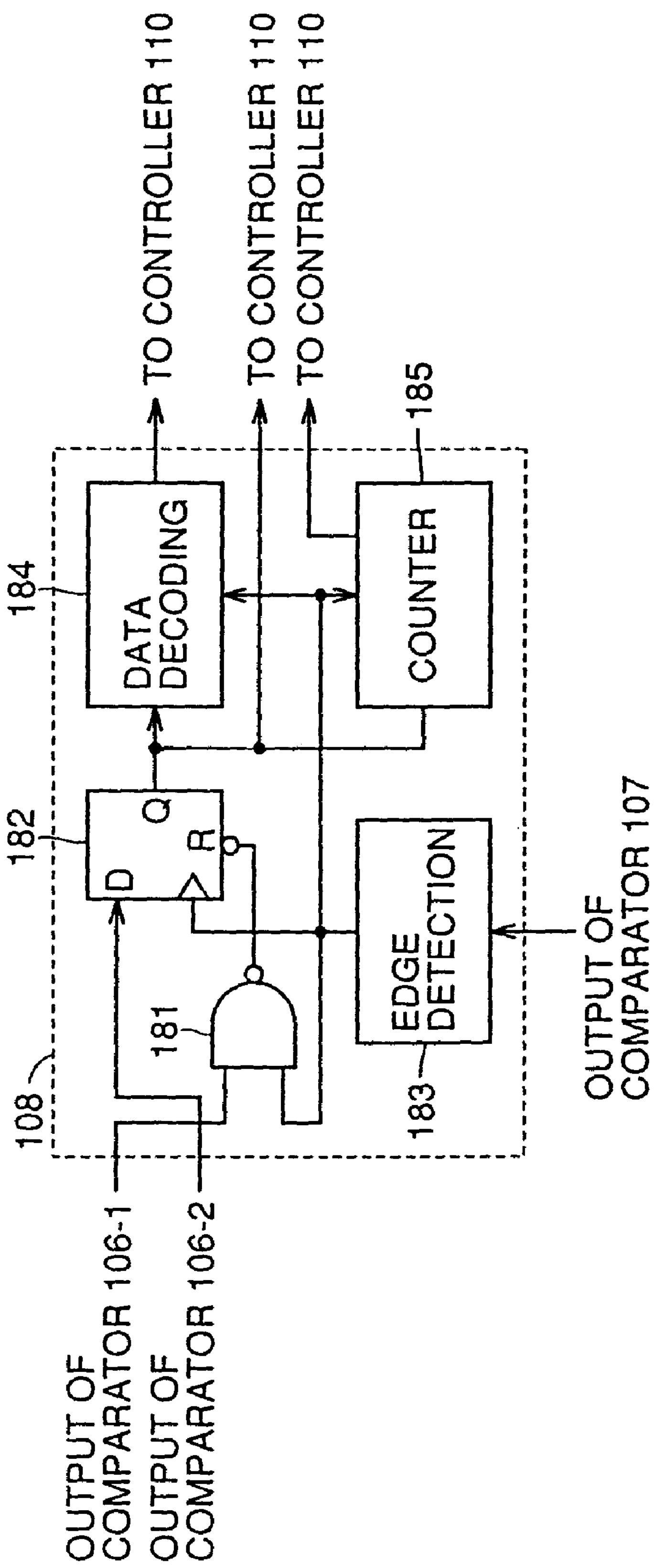
FIG. 12 shows a circuit configuration of an additional information reproducing circuit 108 shown in FIG. 11.

FIG. 12 shows more specific configuration of additional information reproducing circuit 108. Additional information reproducing circuit 108 includes an NAND circuit 181, an FF circuit 182, an edge detecting circuit 183, a data recovering circuit 184 and a counter 185. An output signal from comparator 107 is input to edge detecting circuit 183. Edge detecting circuit 183 detects a falling edge of the output signal of comparator 107, that is, detects the fact that the beam spot comes to a leading edge of the pit, and outputs a pulse. The output pulse is input to one of the input terminals of NAND circuit 181, a clock input terminal of FF circuit 182 and to counter circuit 185.

An output of comparator 106-1 is input to the other input terminal of NAND circuit 181, and an output of NAND circuit 181 is connected to Reset input terminal of FF circuit 182. An output of comparator 106-2 is connected to a data input terminal D of FF circuit 182. FF circuit 182 has an output terminal Q connected to data decoding circuit 184, and data decoding circuit 184 decodes and reproduces the additional information based thereon.

Counter 185 is also connected to output terminal Q of FF circuit 182, and based on the output and the signal from edge detecting circuit 183, the counter counts the number or frequency of detection of the deep pits, as will be described later.

Output terminal Q of FF circuit 182, data decoding circuit 184 and counter 185 are also connected to controller 110, as will be described later.

Figure 13:
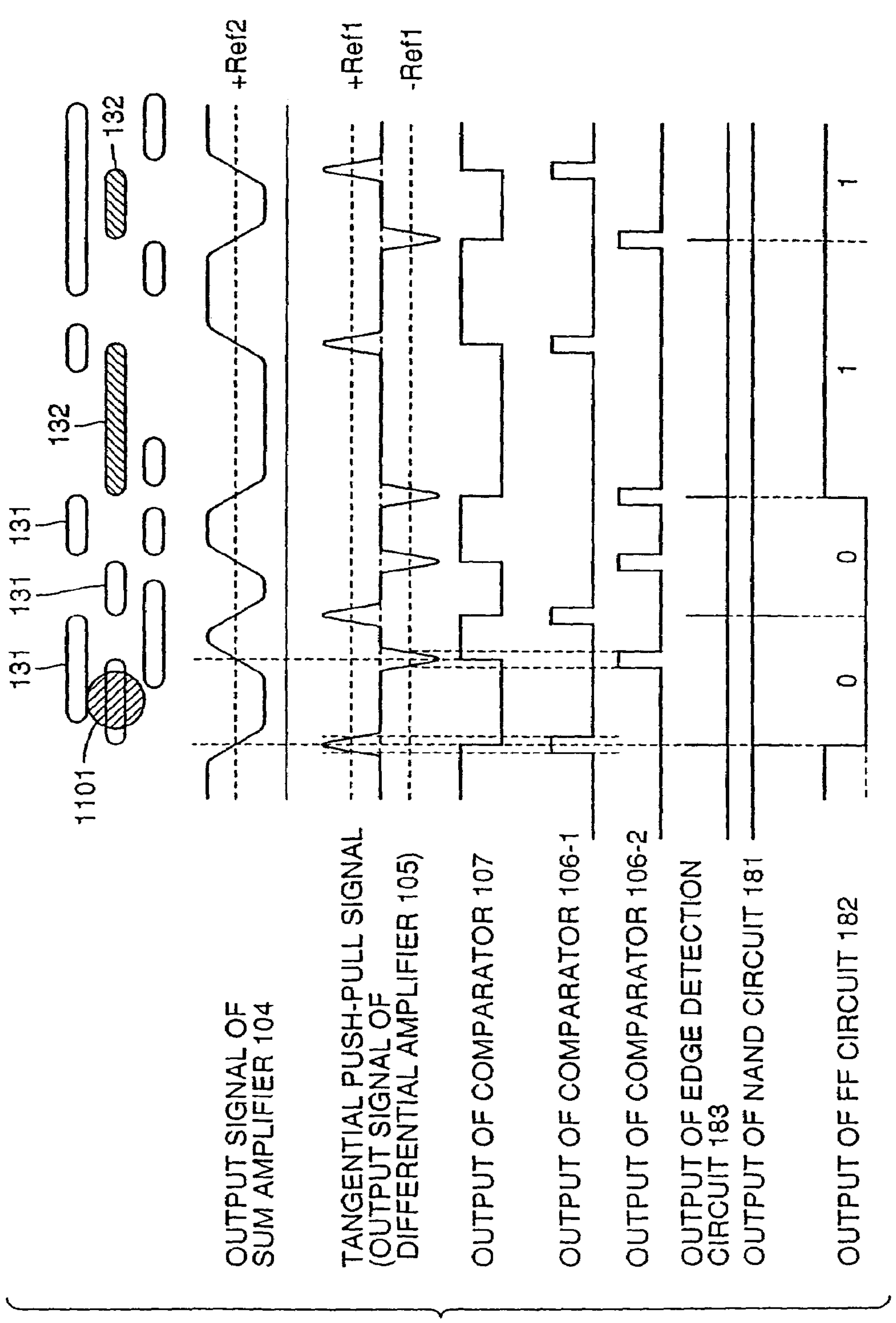
FIG. 13 is a timing chart of an internal circuit of the optical disc reproducing device in accordance with the third embodiment of the present invention.

The operation timings will be described with reference to FIG. 13. Of the pits shown at the uppermost portion of the figure, reference numeral 131 represents a shallow pit and 132 represents a deep pit.

As the light beam 1101 passes over the pit, the output signal of sum amplifier 104 representing the quantity of reflected light shows level variation dependent on presence/absence of the pit. The tangential push-pull signal provides a pulse signal of which polarity corresponds to the depth of the pit, at an edge of the pit, namely, at a point where the output signal from sum amplifier 104 experiences level transition.

The output of comparator 107, the output of comparator 106-1 and the output of comparator 106-2 are the signal based on the quantity of reflected light, that is, the output of sum amplifier 104, and binarized signals of the tangential push-pull signal in the positive and negative directions, respectively, as described above.

Edge detecting circuit 183 outputs a pulse at a leading edge of the pit, that is, at a fall of the output of comparator 107. When light beam 1101 comes to a shallow pit 131, the output of comparator 106-1 attains to the "H" level, and therefore a pulse of "L" level appears at the output of NAND circuit 181, which resets the FF circuit 182. Thus, the terminal Q, which is the output of FF circuit 182 attains to the "L" level, representing the fact that the reproduced pit is a shallow pit.

When light beam 1101 comes to a deep pit 132, the output of comparator 106-2 attains to the "H" level, and the data input terminal D of FF circuit 182 attains to the "H" level. When the output pulse of edge detecting circuit 183 as a clock input is provided, the output terminal Q of FF circuit 182 attains to the "H" level, representing the fact that the pit is a deep pit.

Data decoding circuit 184 utilizes the output Q of FF circuit 182 and the signals obtained pit by pit from edge detecting circuit 183, so as to decode and reproduce the additional information recorded by the pit depth and detects presence/absence of additional information. The data decoding circuit outputs the result to controller 110, and according to the result, controller 110 controls operations of various portions of the optical disc device.

Therefore, it becomes possible to control various operations of the optical disc device in accordance with the additional information, while the recording capacity of the main information is not reduced by the recording of the additional information, and the total recording capacity of the optical disc is increased.

Though the main information is recorded by the presence/absence and the length of the pit in the foregoing, the polarity of the tangential push-pull signal varies by the depth of the pit in any optical disc in which the main information is recorded by at least one of width and position of the pit, that is, any optical disc on which pits are formed, and therefore, the present invention is similarly applicable.

When a conventional optical disc is mounted and reproduced by the optical disc device structured as described above with the conventional disc having the pit depth not intentionally varied, the polarity of the tangential push-pull signal shows the same change at each pit. Therefore, the output of FF circuit 182 is fixed at the "H" level or "L" level. Therefore, naturally, it is impossible to reproduce the additional information based on the depth of the pit. The main information, however, can be reproduced based on the change in the quantity of reflected light derived from presence/absence and the length of the pits. More specifically, in FIG. 11, the main information is decoded and reproduced by the main information reproducing circuit 109 from the output of comparator 107. In reproducing the main information, if the additional information provided by the depth of the pit is unnecessary, the main information is simply reproduced. Specific example of this case is reproduction of an optical disc on which the main information is recorded without encryption, and therefore key information for deciphering is unnecessary for decoding and reproduction.

Therefore, the optical disc device in accordance with the present invention is compatible with the conventional optical disc for reproduction.

More specifically, first, the main information is reproduced in the similar manner as the optical disc device for reproducing the conventional optical disc, and when the main information cannot be correctly reproduced or when existence of additional information is determined or expected from the contents of the main information, the additional information may be reproduced.

If the device is used in this manner, compatibility of reproduction with the conventional optical disc is maintained and if the main information is correctly reproduced, power supply to the block related to reproduction of the additional information, of which operation is unnecessary for the time being may be turned off by the control of controller 110, so that power consumption can effectively be reduced.

The optical disc device described above reproduces the main information based on the sum signal representing the quantity of reflected light, and reproduces the additional information with reference to a tangential push-pull signal which represents difference in intensity distribution of the reflected light of the incident light beam along the tangential direction of the pit string.

Therefore, as described above, the optical disc is compatible for reproduction with the conventional optical disc. The pulse appearing on the tangential push-pull signal has its polarity clearly reversed at ($\lambda/4n$) mentioned above as a boundary, and therefore the difference in depth can easily be determined. Accordingly, only a simple circuit structure is required therefor.

In the conventional optical disc, when the variation in the quantity of reflected light, in other words, amplitude and S/N of the reproduction signal to obtain the main information can be obtained to some extent, it is unnecessary to make the pitch deeper. Therefore, in the optical disc recording additional information, what is necessary is to make deeper the pit than the conventional optical disc or deeper than the pit not containing the additional information, and what is necessary for the optical disc device is to detect/determine that the additional information exists if the pit is determined to be deep, or to reproduce the additional information.

It is unnecessary to add the additional information to all the pits on the optical disc. Therefore, formation of the deeper pits only when the pit should have the additional information is advantageous in view of productivity of the optical disc itself.

Further, it becomes possible for the optical disc device to distinguish a conventional optical disc from the optical disc having additional information in the pit depth, at the time point when the fact that the pit is deep is detected.

As shown in FIG. 12, similar to data decoding circuit 184, the output signal from edge detecting circuit 183 and the output signal Q of FF circuit 182 are also connected to counter 185. The reason for this is as follows. At a deep pit, the output Q of FF circuit 182 attains to the "H" level as described above. Therefore, the section, number, frequency or the number of transition are measured by the signal obtained pit by pit from edge detecting circuit 183.

When additional information is used for a simple object, for example, what is necessary is to simply know whether the ratio of the deep pits is higher than a prescribed ratio, then it is unnecessary to decode the additional information by data decoding circuit 184 described above, and simple reading by the value of counter 185 by the controller 110 may be sufficient. By this approach, it becomes possible to measure the number, ratio, interval between appearances and frequency of appearances of the pits having additional information and to determine that the additional information is detected if the results is a prescribed value or higher. Even when the depths of the pits fluctuate or vary to some extent, at least it is possible to determine whether the optical disc has additional information or not.

Alternatively, the data decoding circuit 184 may be adapted to decode and reproduce the additional information only when the value of counter 185 is a prescribed value or larger, and the controller 180 may be adapted to decode the additional information recovered.

Further, in the optical disc used, when the disc is manufactured such that the number, ratio, interval of appearance and the frequency of appearance of the pit having additional information exceeds a prescribed value, determination of presence/absence of the additional information is possible by the detection of such number or ratio. Even when the depths of the pits may fluctuate or vary, presence/absence of the additional information can be correctly determined.

The data decoding circuit 184 is capable of decoding additional information from the output of FF circuit 182, which is the result of detection of pit depth. In that case, one bit of additional information is allotted to one pit dependent on the depth, and therefore, the output pulse of the edge detecting circuit output at every pit represents the clock corresponding to every bit of the additional information.

Generally, the frequency of appearance and the length of the pits on an optical disc assume constant values when averaged over a relatively long period of time, and the values are known, as these values are determined by modulation and the like.

Therefore, when the amount of information of one unit of the additional information to be recorded on the optical disc is defined in accordance with the value associated with the recording unit of the main information and when the information of one unit is extracted on the side of the optical disc device, it becomes possible to synchronize the main information with the additional information. In that case, additional information matching the content of the main information can be reproduced, for example, superposed text as additional information for the video image of the main information, or voice or text information of sightseeing guide as additional information for the scenery image or map of the main information.

As described above, in the optical disc reproducing device in accordance with the third embodiment of the present invention, whether the reproduced pit is a shallow pit or a deep pit is detected by additional information reproducing circuit 108, so as to reproduce additional information or to detect presence/absence of the additional information. Therefore, while maintaining compatibility of the conventional optical disc in which the pits have the constant depth, it becomes possible to reproduce additional information in synchronization with the reproduction of the main information. Further, when a counter 185 is adapted to detect frequency of appearance of deep pits, for example, it becomes possible to use the additional information in a simple object, without the necessity of reproducing the additional information.

FOURTH EMBODIMENT

The fourth embodiment of the present invention will be described in the following. In the present embodiment, the additional information described in the embodiments above is used as countermeasure against unauthorized copy or reproduction.

As is well known, optical disc includes not only those discs for reproduction only on which information is recorded by pits. A recordable optical disc has been known on which recording is possible by forming marks of different reflectance, using dies or phase changing material, for example. It is possible to reproduce such an optical disc in the similar manner as the pit-recorded optical disc, based on the variation in the quantity of the light beam directed to and reflected from the recording marks.

Though recording of presence/absence and length of the recording marks are recordable on the recordable optical disc, information corresponding to the pit depth is not recordable. Therefore, if the information of which content cannot be reproduced correctly without the additional information recorded by the pit depth on the original optical disc, a dead copy of the original disc on a recordable optical disc, that is, a bootleg optical disc cannot be reproduced correctly. Therefore, unauthorized reproduction or use of the bootleg optical disc can be prevented.

What should be done when the additional information cannot be reproduced or detected, that is, countermeasures against unauthorized reproduction utilizing the additional information, will be described in the following.

As a simple example, when the additional information cannot be reproduced or detected, the main information may be limited by the control of controller 110. For example, when the optical disc recording a motion picture is to be reproduced, for example, the motion picture or voice as the main information may be reproduced only for a few minutes. Alternatively, reproduction may be inhibited altogether. In this manner, reproduction of the optical disc copied without authorization can be inhibited. The limited reproduction, allowing partial reproduction only, may urge the user to buy not a bootleg but the official optical disc having information recorded by the pits.

Even when the additional information is physically reproducible, the additional information may be regarded not reproduced if the reproduced information does not match a type of password recorded as a part of the main information in advance. The same applies to the following descriptions.

When reproduction of the optical disc is inhibited if the additional information is not reproduced or not detected, the subsequent operations of the optical disc device itself may be limited.

More specifically, even when the user instructs ejection of the optical disc, the instruction may be rejected or ignored. Alternatively, only the operation of immediate ejection of the optical disc may be done. In this manner, it is impossible to reproduce the optical disc copied without authorization. The user may feel guilty and discouraged to buy or use the disc copied without authorization thereafter.

The power of servo control circuit 111 may be turned off by the instruction from controller 110 or internal operation may be stopped to substantially cut the path of the servo signal, to prevent reproduction of the information. In such a case, reproduction is impossible and the small sound of operation resulting from the servo operation of the optical disc device cannot be heard, and the device stops abruptly. It seems to the user as if the device itself fails because of mounting of the disc copied without authorization, and therefore, it may have further effect of discouraging use of the unauthorized copy.

If the additional information cannot be reproduced or detected, it is possible that the mounted optical disc is a recordable disc. Therefore, it may be possible to record on a specific portion of the optical disc the information of warning of the unauthorized reproduction, or it may be possible to rewrite or erase part of the information, to prevent subsequent reproduction.

This approach goes further from the level of simply ejecting the optical disc or simply refusing reproduction, and the optical disc copied without authorization of which reproduction is tried can never be reproduced even by other optical disc devices. Therefore, it serves as a powerful penalty against copying without authorization.

It goes without saying that not all recordable optical discs are bootleg copies. Therefore, such recording of information or erasure of information may be refrained when the optical disc allows reproduction of main information, even without additional information.

Practical application of this method may require legal considerations. If more effective penalty against unauthorized reproduction becomes widely acceptable in the society, it may be an effective method.

If the additional information cannot be reproduced or cannot be detected, the polarity of the tracking servo may be reversed. This prevents reproduction of information of the optical disc which seems to be a copy without authorization, and it also serves as a method of decodey to reproduce additional information with the servo polarity reversed to investigate the reason why reproduction is impossible, if the additional information is duly recorded.

Further, if the additional information cannot be reproduced or cannot be detected, simply the fact of failure of reproduction or detection may be displayed visually at the display unit 112 of FIG. 11, more specifically, on a display or an LED (Light Emitting Diode), or may be indicated by sound or a buzzer or a synthesized voice. Alternatively, a warning may be issued by such visual or audio indication. A display or warning of the optical disc copied without authorization may be given, and alternatively, indication of a conventional optical disc without the additional information recorded by the pit depth may be indicated to the user.

As described above, in the optical disc in accordance with the fourth embodiment, information preventing correct reproduction of the main information without the additional information is recorded included in the additional information, and thus unauthorized reproduction can be prevented. Further, it is possible to discourage unauthorized copying by the user, by limiting operation of the optical disc reproducing device when the optical disc copied without authorization is detected.

FIFTH EMBODIMENT

The fifth embodiment of the present invention will be described. In the fourth embodiment above, the method of using the additional information mainly as a countermeasure against unauthorized copying has been described. In the present embodiment, the additional information is used, for example, as information assisting reproduction of the main information.

Assisting information necessary for reproducing information of the optical disc includes a de-scramble key for the main information, a decipher key, an error correction parity, a synchronizing signal and address information. In the conventional optical disc, such information is embedded in the main information, consuming recording capacity of the optical disc. When such information is recorded as the additional information by the depth of the pit, consumption can be avoided. Further, increase in recording capacity is desirable for the optical disc device as well, as the time of reproduction of one optical disc becomes longer.

The above described assisting information is so important that main information cannot be reproduced naturally if the assisting information as the additional information cannot be reproduced. Therefore, reproduction of an optical disc copied without authorization as described above cannot be reproduced without any specific operation of the optical disc device as described in the fourth embodiment above.

As to the error correction parity, the larger the parity in number, the higher the correction capability. However, larger number of parities reduces recording capacity of main information on the conventional optical disc, and therefore, the number has been limited. In the optical disc in accordance with the present invention, increase in the amount of additional information does not directly lead to decrease in capacity of the main information. Therefore, when the additional information recorded by the pit depth is used as the error correction parities, the number of the error correction parities can be increased to match the required correction capability. This approach is preferable for the optical disc device as well, since reliability of the reproduced signal increases when the error correction capability is improved, and therefore disturbance of image or sound and the error ratio can be reduced.

When a conventional optical disc such as the CD or the DVD is to be reproduced, the disc may be determined to be the conventional optical disc dependent on whether pits of different depths exist or not, as described above, or alternatively, it may be determined to be a conventional optical disc if error correction is possible by the main information. In that case, the error correction parity embedded in the main information is used.

When the additional information recorded by the depth is a de-scramble key, a decipher key or the like, and such key is fixed, decoding thereof may be possible by a user having some skill. Bootleg distribution is possible by copying the main information on recordable optical discs and distributing the decoded key.

Such possibility of decoding by unauthorized user can significantly be reduced when the information of the de-scramble key or decipher key is changed frequently, for example, changed sector by sector. Such frequent changing of key information was not possible in the conventional optical disc as it reduces capacity for the main information. In the present invention, however, the capacity of the main information is not reduced by the additional information, and therefore frequent change of the key is possible. This practically inhibits unauthorized reproduction.

Assisting information may include, in addition to those mentioned above, superimposed text, voice guide, simple still image, text information, operation guide and so on.

In such a case, the additional information reproduced by additional information reproducing circuit 108 in the similar manner as in the fourth embodiment is input to controller 110. Controller 110 determines the contents of the additional information. When the contents are superimposed text, the text is output in synchronization with the motion picture as the main information, and if the assisting information is operation guide information, prescribed operation is performed.

The assisting information may be recorded together with the main information. It is necessary, however, for the optical disc device in case that the assisting information is the operation guide, to read the information of that area and to store the read area in the memory, for example. Further, it may be possible to read assisting information by accessing an assisting information area while reproducing the main information, and to continue reproduction of the main information.

When the optical disc having the additional information added by the pit depth is used, it becomes possible to obtain the assisting information in synchronization with or parallel to the reproduction of the main information, and therefore, the above described processing is unnecessary. Therefore, the memory can be reduced, and the operation of the device in reproducing the main information can be stabilized.

The optical disc device in accordance with the present invention does not require any special or additional mechanical system or optical pickup, and the conventional mechanical system and the pickup can be used.

This suppresses increase in cost and the scale of the device.

As described above, in the optical disc in accordance with the fifth embodiment of the present invention, de-scramble key of the main information, a decipher key, an error correction parity and the like are recorded as the additional information. Therefore, de-scrambling, deciphering, error correction capability and the like can be improved without reducing the recording capacity of the optical disc. Further, as it is possible to frequently change the de-scramble key or the decipher key without reducing the recording capacity of the optical disc, decoding by the user without authorization can more effectively be prevented.

SIXTH EMBODIMENT

In the above described first to fifth embodiments, that the polarity of the tangential push-pull signal is reversed dependent on the pit depths means that the diffraction pattern of the reflected light changes dependent on the pit depth. Therefore, in the phase difference method or the push-pull method utilizing intensity distribution derived from the diffraction pattern of the reflected light, it is possible that the tracking signal has its polarity reversed from a deep pit to a shallow pit. Therefore, correct tracking servo control is impossible by the conventional method such as the phase difference method or the push-pull method.

The present embodiment is to provide a technique enabling correct tracking servo control even for an optical disc having pits of different depths.

Figure 14:
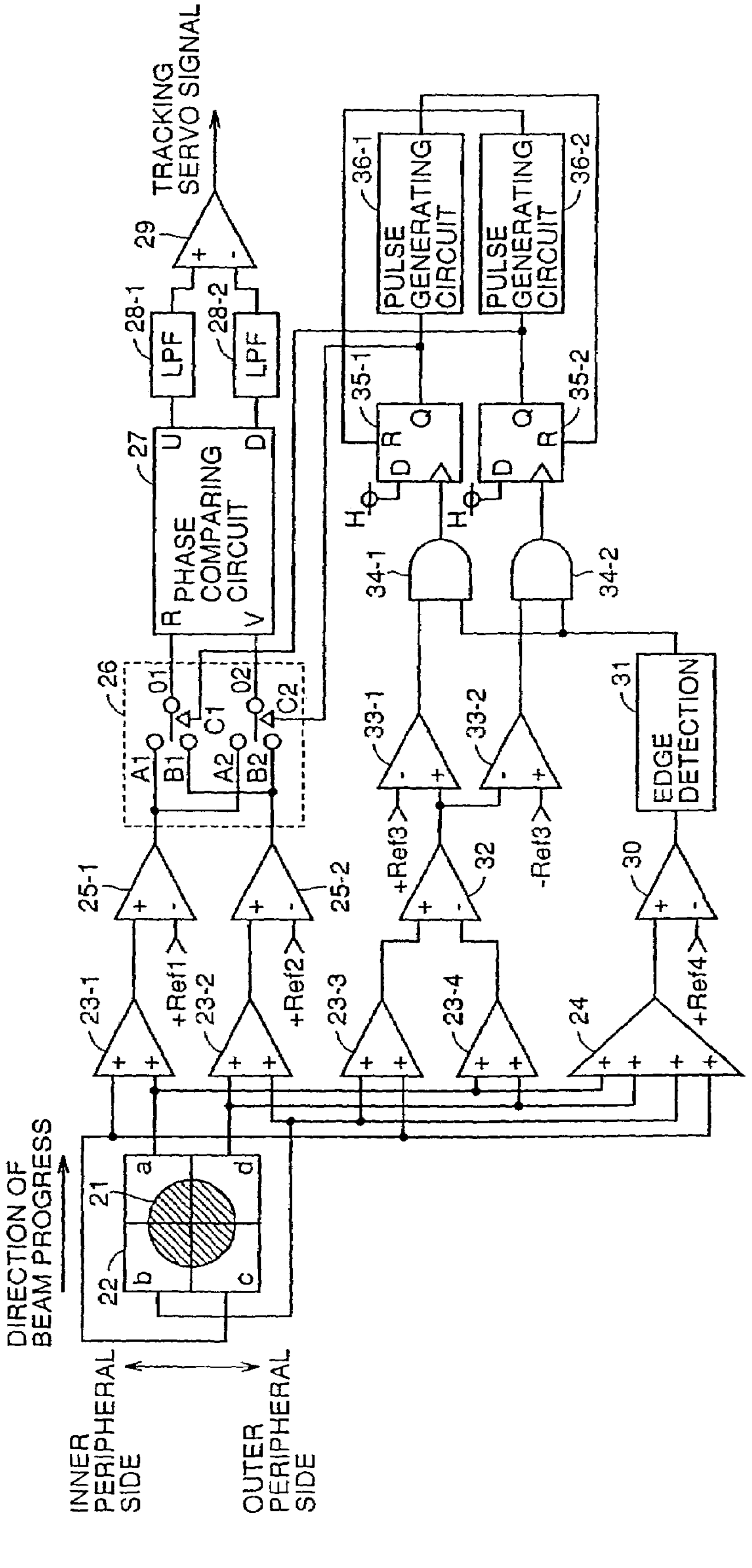
FIG. 14 is a block diagram showing a circuit configuration of a main portion of an optical disc reproducing device in accordance with a sixth embodiment of the present invention.

FIG. 14 is a block diagram of a main portion of an optical disc device using the phase difference method to generate a tracking signal, to which the present invention is applied. The optical disc device includes a photodetector 22, sum amplifiers 23-1 to 23-4 and 24, differential amplifiers 29 and 32, comparators 25-1, 25-2, 30, 33-1 and 33-2, a switch 26, a phase comparing circuit 27, lowpass filters (LPFs) 28-1 and 28-2, an edge detecting circuit 31, AND circuits 34-1 and 34-2, FF circuits 35-1 and 35-2, and pulse generating circuits 36-1 and 36-2.

The light reflected from the optical disc is condensed and introduced to photodetector 22, and photodetector 22 outputs signals in proportion to the quantities of incident light. Photodetector 22 is arranged such that the reflected light is divided along two directions, that is, the tangential direction of the pit string formed on the disc, that is, the direction of progress of the light beam, and the radial direction of the optical disc.

Sum amplifiers 23-1 and 23-2 output sum signals of the output from elements a and c and outputs from elements b and d, positioned at opposing corners of photodetector 22, respectively. Sum amplifiers 23-3 and 23-4 output sum signals of outputs from elements a and d along the direction of progress of the light beam and elements from b and c in the opposite direction to the progress of the light beam.

Sum amplifier 24 calculates and outputs total sum of the outputs from photodetector 22. Outputs from sum amplifiers 23-1 and 23-2 are compared with reference voltages +Ref1 and +Ref2 set in advance in comparators 25-1 and 25-2, respectively, and binary signals as the result of comparison are input to selecting circuit 26.

Switch (selecting circuit) 26 is for switching outputs of comparators 25-1 and 25-2 to be input to which of R and V input terminals of phase comparing circuit 27, and the switching is performed in accordance with an output signal from the FF circuit, which will be described later.

Phase comparing circuit 7 compares the R input and the V input, and outputs a pulse having such a width that corresponds to the phase difference therebetween, dependent on which phase difference is advanced. In this example, a pulse of which width corresponds to the amount of delay is output from a U output when the V input is delayed from the R input, and from a D output when the V input is advanced.

The U output signal and the D output signal of phase comparing circuit 27 have only the low frequency components extracted by LPFs 28-1 and 28-2, and input to differential amplifier 29. Differential amplifier outputs as the tracking signal, the difference between the outputs of LPFs 28-1 and 28-2, that is, the difference between the low frequency components of the outputs of phase comparing circuit 27.

The output of sum amplifier 24, which calculates the total sum of the output signals from photodetector 22 is compared with a reference voltage +Ref4 by a comparator (comparing circuit) 30, and the resulting binary signal, that is, a signal representing magnitude of the quantity of the reflected light dependent on presence/absence of the pit, is input to edge detecting circuit 31. Edge detecting circuit 31 outputs a pulse at a falling edge corresponding to transition of non-pit→pit, of the rising and falling edges of the output signal from comparator 30.

The outputs of sum amplifiers 23-3 and 23-4 which calculate outputs of elements position forward and rearward along the direction of progress of the light beam among the elements of photodetector 22 are input to differential amplifier 32. An output of differential amplifier 32 (tangential push-pull signal) is input to comparators (comparing circuits) 33-1 and 33-2. Comparator 33-1 compares the tangential push-pull signal with a reference voltage +Ref3 set in advance, and outputs "H" level when the tangential push-pull signal is larger than +Ref3. Comparator 33-2 compares the tangential push-pull signal with a reference voltage –Ref3 set in advance, and when the tangential push-pull signal is smaller than –Ref3, outputs the "H" level.

Outputs of comparators 33-1 and 33-2 are connected to one input terminal of AND gates (mask circuits) 34-1 and 34-2, respectively, and an output of edge detecting circuit 31 is connected to the other input terminal of AND gates 34-1 and 34-2.

Therefore, when a pulse is output from edge detecting circuit 31, AND gates 34-1 and 34-2 output a pulse, dependent on which of the outputs from comparators 33-1 and 33-2 is at the "H" level.

From a different point of view, AND gates 34-1 and 34-2 may be considered as outputting binarized tangential push-pull signals, that is, output of comparators 33-1 and 33-2 at the point of transition of binarized signal representing the quantity of reflected light, that is, the output of edge detecting circuit 31.

Alternatively, AND gates 34-1 and 34-2 may be considered as masking and not outputting the change of outputs of comparators 33-1 and 33-2 except at a specific timing when the edge detecting circuit 31 generates a pulse.

The outputs of AND gates 34-1 and 34-2 are connected to clock inputs of FF circuits 35-1 and 35-2, respectively. The D input terminal is fixed at the "H" level. Therefore, when a pulse is input to the clock input, FF circuits 35-1 and 35-2 come to have the "H" level at the output, and when a pulse is input to a reset terminal, the output attains to "L" level.

An output of pulse generating circuit 36-2 generating a pulse at a rise of the output Q of FF circuit 35-2 is connected to the reset terminal of FF circuit 35-1, and the output of pulse generating circuit 36-1 generating a pulse at the rise of the output Q of FF circuit 35-1 is connected to the reset terminal of FF circuit 35-2. Therefore, when the output Q of FF circuit 35-1 or 35-2 rises, that is, when a pulse is output from the AND gate circuit 34-1 or 34-2 to FF circuit 35-1 or 35-2, the other FF circuit is reset.

The outputs Q of FF circuits 35-1 and 35-2 are connected to control terminals C1 and C2 of switch 26, respectively. When the output of FF circuit 15-1 is at the "H" and the output of FF circuit 35-2 is at the "L" level, the terminal O1 of switch 26 is connected to the side of A1 and the terminal O2 is connected to the side of B2, an output of comparator 25-1 is selected and connected to R input terminal, and the output of comparator 25-2 is selected and connected to V input terminal, of phase comparing circuit 27. When the states are inverted and output of FF circuit 35-1 is at "L" and the output of FF circuit 35-2 is at the "H", the terminal O1 of switch 26 is connected to the side of B1 and the terminal O2 is connected to the side of A2, and the output of comparator 25-2 is selected and connected to R input terminal and the output of comparator 25-1 is selected to V input terminal, of phase comparing circuit 27.

As already described, phase comparing circuit 27 compares phase difference between R input and V input and provides a pulse in accordance with the amount and direction of advance or delay. Therefore, when the R input and the V input are switched, the terminal at which the pulse is output is switched.

Therefore, when the state of the outputs Q of FF circuits 35-1 and 35-2 change, the polarity of the tracking signal as the output of differential amplifier 29 is reversed.

In the following, the signals and timings at various portions of FIG. 14 when the light beam follows a pit string on an optical disc having pits of different depths will be described with reference to FIG. 15.

Figure 15:
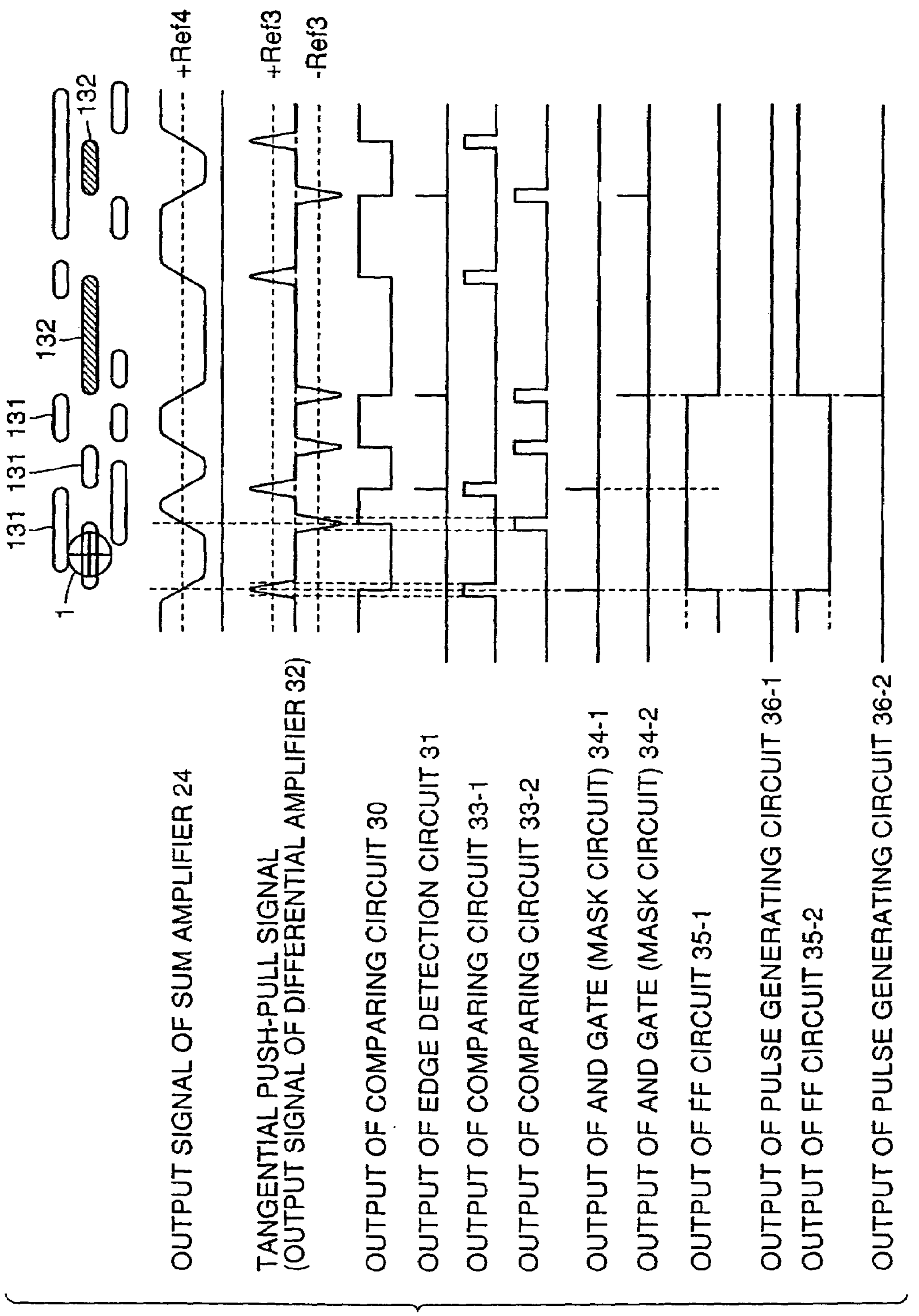
FIG. 15 is a timing chart of an internal circuit of the optical disc reproducing device in accordance with the sixth embodiment of the present invention.

In FIG. 15, reference numeral 131 denotes relatively shallow pit, and hatched portion 132 represents a relatively deep pit. An output signal from sum amplifier 24, which represents the amount of light reflected from the pits as light beam 1 follows the pits, has its level varied in accordance with presence/absence of the pit. When the light beam comes close to a pit, the level lowers gradually, and when the beam goes out from the pit, the level gradually increases.

The tangential push-pull signal, which is the output of differential amplifier 32 is the difference of the intensity distribution of the reflected light beam along the tangential direction of the pit string as described above. Therefore, when the former half and the latter half along the direction of progress of the light beam are different in intensity distribution, that is, when the light beam comes to a pit or goes out from the pit, it becomes a pulse-shaped signal near the leading edge or the trailing edge, of opposite polarity.

The intensity distribution of the light reflected from the pit is the result of influence of diffraction of the light beam caused by the pit. The direction of diffraction is inverted at the point of ($\lambda$/4n), where $\lambda$ represents the wavelength of the light used (light beam) and n represents the index of refraction of the optical disc substrate. Therefore, when shallow pits shallower than the value ($\lambda$/4n) and pits deeper than that value are formed, the polarity of the tangential push-pull signal when the light beam comes to and goes out from the pit will be reversed.

Accordingly, when the polarity of the tangential push-pull signal at the point where the level of the output signal from sum amplifier 24, representing the amount of reflected light is monitored, it is possible to determine and detect the depth of the pit. When a process of reversing polarity of the tracking signal based thereon is performed, correct tracking servo control becomes possible, not dependent on the depth of the pit. This is the basic idea of the present invention.

At the same time, it may be possible to detect the depth of the pit from the tangential push-pull signal or the like, a deeper pit may be adopted to have different meaning to increase recording density, or to allot additional information, in accordance with the difference in depth. Switching of the polarity of the tracking servo signal in accordance with the present invention is similarly effective in such an optical disc. Even when pits of different depths are mixed, correct tracking is possible, and reproduction of the additional information can be done successfully.

In FIG. 15, the tangential push-pull signal is described as being positive when the light beam comes to a shallow pit 131 and negative when the beam goes out from the shallow pit, and the polarities are reversed when the beam comes to and goes out from a deep pit 132, in FIG. 15. The relation may be reversed and the embodiment can easily be implemented with some modification of circuit connection, for example.

Returning to FIG. 15, the description of the operation is continued. The output signal from comparing circuit 30 is the output signal from sum amplifier 24 binarized with reference to the reference voltage +Ref4 by means of comparator 30. This is not related to the depth of the pit, and the level of this signal changes to and from "H" and "L" dependent on the presence/absence of the pit. The level transition occurs near the edge of the pit. Edge detecting circuit 31 outputs a pulse signal only at the fall of the output signal of comparing circuit 30, that is, only when the light beam comes to a pit.

The tangential push-pull signal is compared with +Ref3 and −Ref3 which are reference values different from each other at comparators 33-1 and 33-2, respectively, and output as binary signals. Logical product of the binary signals and the output of edge detecting circuit 31 are the output signals from AND gates 34-1 and 34-2, respectively. At a shallow pit, the output of comparator 33-1 attains to the "H" level at a point where the pulse is generated in the output signal of edge detecting circuit 31, and therefore, a pulse is generated at the output signal of AND gate 34-1, and the output Q of FF circuit 35-1 attains to the "H" level. At a deep pit, by contrast, the output signal of comparator 33-2 attains to the "H" level at a point where the pulse is generated in the output signal of edge detecting circuit 31, so that a pulse is generated at the output signal of AND gate 34-2, and the output Q of FF circuit 35-2 attains to the "H" level.

As already described, switch 26 is switched by the outputs Q of FF circuits 35-1 and 35-2, and the input signal to phase comparing circuit 27 is switched. Therefore, the polarity of the tracking servo signal is automatically switched to be appropriate for the pit depth.

In FIG. 14, switch (selecting circuit) 26 is configured to switch the input of phase comparing circuit 27. The switch may be inserted between U and D terminals as the outputs of phase comparing circuit 27 and LPFs 28-1 and 28-2 to switch the output of phase comparator 27, so as to enable switching of the polarity of the tracking servo signal in the similar manner.

Alternatively, phase comparing circuit 27 may include two sets of circuits detecting phase difference between the R input and the V input, with one set of the circuits detects the advance or delay of the V input with the R input being the reference, and the other of the circuits detects the advance or delay of the R input with the V input being the reference. In such a configuration, the operation of phase comparing circuit 27 may be directly switched to operate only one, using outputs Q of FF circuits 35-1 and 35-2.

Alternatively, a configuration may be possible in which switch 26 is inserted between LPFs 28-1 and 28-2 and differential amplifier 29 so as to switch polarity of the tracking servo signal, or a configuration may be possible in which an inversion amplifier inverting an output of differential amplifier 29 is provided separately, an output of differential amplifier 29 or the output of inverting amplifier is selected and used as the tracking servo signal.

Figure 16:
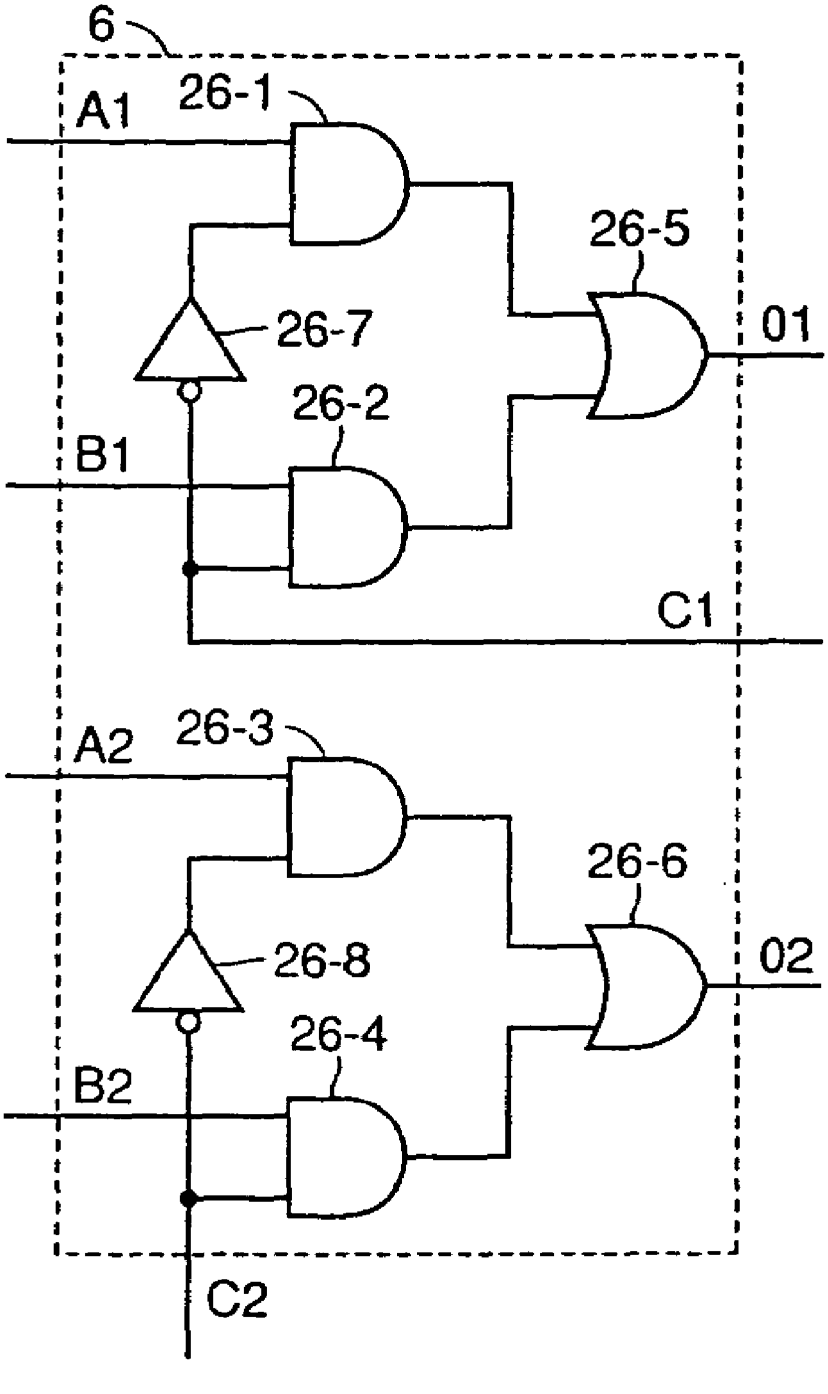
FIG. 16 shows a circuit configuration of a switch 26 shown in FIG. 14.

In FIG. 14, switch 26 is so configured as to select and output the binary (digital) signals as the output signals from comparators 25-1 and 25-2. Therefore, it may be a selector including AND gates 26-1 to 26-4, OR gates 26-5 and 26-6 and inverters 26-7 and 26-8, such as shown in FIG. 16.

Further, in FIG. 14, AND gates 34-1 and 34-2 may be omitted, the output of edge detecting circuit 31 may be directly applied to the clock inputs of FF circuits 35-1 and 35-2, the D input terminal of FF circuit 35-1 may not be fixed at the "H" level but rather connected to the output of comparator 33-1, and the D input of FF circuit 35-2 may not be fixed at the "H" level but rather connected to the output of comparator 33-2, to attain similar operation.

Even when edge detecting circuit 31 outputs a pulse not at the fall but at the rise of the output of comparator 30, or if the edge detecting circuit 31 generates pulses both at the rise and fall of the output of comparator 30, a configuration allowing automatic switching of the polarity of tracking servo signal in accordance with the depth of the pit can be realized with minor modification of the circuitry.

In the components of the present embodiment, when the output of each element of photodetector 22 is binarized by the comparator, most of the subsequent operations are performed by processing the binarized signal. Particularly, the portions for detecting the pit depth from comparators 33-1 and 33-2 related to the tangential push-pull signal and comparator 30 related to the total sum signal of the quantity of light up to a control of switch 26, and switch 26 itself if the switch has such a configuration as shown in FIG. 16, can be implemented by a digital IC, facilitating integration.

In the present embodiment, the tracking servo signal is generated by the phase difference method. The phase difference method is advantageous in that when the light beam follows a pit string on an optical disc with large eccentricity, the tracking servo signal is not much susceptible to offset even when the objective lens condensing the light beam is much displaced. Further, phase difference detection after the signals from the photodetector are binarized can be processed by a digital circuit, which is further advantageous in view of integration of the circuitry.

As to photodetector 22, in the present embodiment, elements are arranged such that of the reflected light of the light beam, intensity distribution approximately parallel to the tangential direction of the pit string and approximately parallel to the radial direction of the optical disc are detected. Therefore, it is possible to obtain the tangential push-pull signal, push-pull signal and a signal corresponding to the total sum of the quantity of the reflected light, based on the intensity distributions of the reflected light.

Further, the photodetector is divided into four elements along the tangential direction of the pit string and along the radial direction of the optical disc. The photodetector of this configuration has been widely used in the optical pickup for the conventional optical disc devices. This configuration also allows generation of a focus error signal in accordance with astigmatism, and automatic switching of the polarity of the tracking servo signal and detection of the pit depth in accordance with the present invention are also possible without the necessity of adding any new element to the conventional optical pickup.

As already described, when the pit depth is one and constant as in the conventional optical disc, the change in polarity of the tangential push-pull signal along with the change in the level of the output signal from sum amplifier 24, which is the total sum signal of the quantity of reflected light, is constant. Therefore, the polarity of the tracking servo signal is fixed to the one appropriate for the pit depth, and compatibility with the conventional optical disc is maintained.

In the recordable type optical disc in which recording marks of different reflectances are formed by optical irradiation rather than the pits, not only the signal as the total sum of the amount of reflected light but also the tangential push-pull signal can be obtained. This is because there is generated a difference in intensity distribution along the forward and rearward direction of the progress of the light beam, when the light beam comes to and goes out from a recording mark.

Here, the change in polarity of the tangential push-pull signal in accordance with the reflectance of the recording mark is constant, the polarity of the tracking servo signal is thus fixed, and reproduction of information provided by the recording marks can be done correctly.

If the contents of an optical disc having information recorded by the depth of the pits is copied on this type of recordable optical disc, only the information represented by the total sum of the amount of reflected light can be copied but the information in accordance with the depth of the pits cannot be copied. Therefore, the copy of the information recorded by the depth of the pits can be prevented.

Utilizing the fact that the polarity of the tracking servo signal is fixed on the recordable optical disc on which recording marks of different reflectances are formed, the pit depth may be adjusted such that the polarity of the tracking servo signal is fixed to the opposite polarity. In such a case, correct tracking servo control is possible for an optical disc on which information is recorded by pits, while the polarity of the tracking servo signal is reversed when the recordable type optical disc on which the information is copied is mounted, the track cannot be followed but deviated and the information cannot be reproduced. Therefore, such approach may be effective in preventing unauthorized copying.

As described above, in the optical disc reproducing apparatus in accordance with the sixth embodiment, the polarity of the tracking servo signal is automatically switched by detecting the pit depth. Therefore, even when an optical disc having pits of different depths formed thereon is to be reproduced, accurate tracking servo control is possible. Further, as most of the tracking servo signal generating circuit can be implemented by a digital circuit, integration of the circuit becomes possible, which improves reliability of the circuit and reduces the cost and area occupation.

SEVENTH EMBODIMENT

The seventh embodiment of the present invention will be described with reference to FIG. 17. In the present embodiment, the photodetector receiving the reflected light is different from that of the sixth embodiment.

Generally, the photodetector 22 having such a configuration as shown in FIG. 14 is often used in an optical pickup fabricated by assembling separate optical components. Though not described in the sixth embodiment, a focus servo signal is often generated as well from the signal detected by photodetector 22. In that case, optical technique referred to as astigmatism is utilized.

In the astigmatism, adjustment of the optical system is rather sensitive, and the number of separate components is considerably large. Therefore, cost of assembly and adjustment tends to be higher.

Recently, one package containing a photodetector, a semiconductor laser as a light source and the like integrated to reduce the number of separate components and to facilitate adjustment of the optical system comes to be widely used. This is the so called hologram laser unit, in which part of the optical system is replaced by a kind of diffraction grating referred to as a hologram, and the focus servo signal, the tracking servo signal and reproduction of the recorded information signal can be generated from an output signal of a photodetector contained therein.

Figure 17:
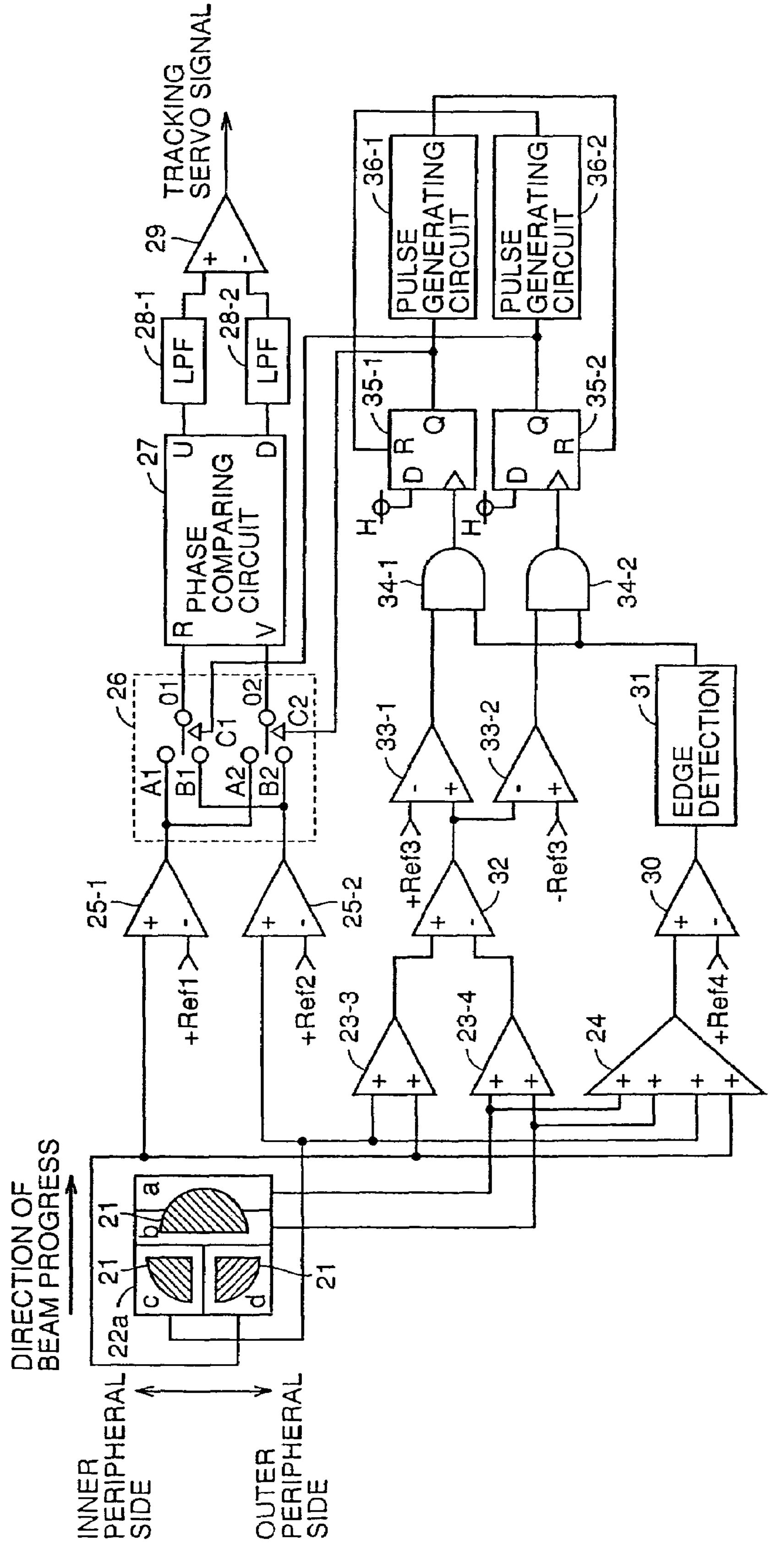
FIG. 17 is a block diagram showing a circuit configuration of an optical disc reproducing device in accordance with the seventh embodiment of the present invention.

FIG. 17 is a block diagram of a main portion of the optical disc device using the phase difference method for generating the tracking signal, to which the present invention is applied. Here, photodetector 22*a* is not divided into four elements along the tangential direction of the pit string and the radial direction of the optical disc, but rather modified.

As in the first embodiment, photodetector 22*a* of FIG. 17 has four elements a, b, c and d. The reflected light, however, is divided by the hologram as the diffraction grating mentioned above, and condensed as separate pieces on respective elements. Elements a and b receive those portions of the reflected light which correspond to the former half along the scanning proceeding direction of the light beam. As the hologram is so designed that the quantity of light incident on the elements change in accordance with the deviation of the point of focus with respect to the optical disc, from the output difference of elements a and b, the focus servo signal can be obtained. The elements c and d receive portions of the light corresponding to the latter half of the reflected light. As the elements are so arranged as to receive light from the inner peripheral side and the outer peripheral side of the optical disc, it is possible to obtain the tracking signal by the phase difference method or the push-pull method from the elements c and d, as will be described later. The total sum of the outputs of all the elements reflects the change in the amount of reflected light, that is, the information signal recorded on the optical disc.

In order to obtain the tangential push-pull signal, what is necessary is to calculate difference in the quantity of light along the progress scanning direction of the reflected light of the beam, that is, along the tangential direction of the pit string. In FIG. 17, the sum of the outputs from elements a and b receiving the reflected light corresponding to the former half is calculated by sum amplifier 23-4, and the sum of outputs of elements c and d receiving the reflected light corresponding to the latter half is calculated by the sum amplifier 23-3, and the difference between the results of addition of this is calculated by differential amplifier 32.

The sum amplifier 24 calculating the total sum signal of the quantity of light is so connected as to calculate the sum of the outputs of elements a, b, c and d, as in FIG. 14 described above.

The sum amplifiers 23-1 and 23-2 shown in FIG. 14 for generating the tracking signal in accordance with the phase difference method are not provided in the structure of FIG. 17. The reason for this is as follows. The arrangement of the elements in detector 22*a* is different as described above, and therefore the signal for phase difference method cannot be obtained by using the signals from elements a and b. In other words, elements a and b are arranged not to detect the intensity distribution along the radial direction of the optical disc, and elements c and d are arranged to enable such detection. Difference from the arrangement of element in photodetector 22 shown in FIG. 14 comes from the fact that the arrangement is selected to attain a smaller component incorporated in a hologram laser unit.

If there are outputs of two elements receiving the light reflected from the inner peripheral and outer peripheral sides of the pit, that is, along the radial direction of the optical disc are provided, there is certainly a phase difference derived from relative positional deviation from the pit string and the light beam, in the outputs. Therefore, the tracking signal can be generated by the phase different method. Therefore, in FIG. 17, the outputs of elements c and d are not added to any other output but directly applied to comparators 25-1 and 25-2.

The operation and the timing of the circuit shown in FIG. 17 are the same as those of the embodiments described above. Therefore, detailed description is not repeated.

In photodetector 22*a*, in this embodiment also, elements are arranged so as to enable detection of intensity distribution in the direction approximately parallel to the tangential direction of the pit string and to the radial direction of the optical disc, among the reflected light. The elements c and d detect the intensity distribution in the direction approximately parallel to the radial direction of the optical disc, and the pair of elements c and d relative to the pair of elements a and b detect intensity distribution in the direction approximately parallel to the tangential direction of the pit string. As in the sixth embodiment, it is possible to obtain the tangential push-pull signal, the signal necessary for the phase difference method, and signal corresponding to the total sum of the quantity of the reflected light, from the output of photodetector 22*a*.

Further, the arrangement of the elements is suitable for the hologram laser unit. Therefore, the advantage of the present invention that the pit depth is detected and the polarity of the tracking servo signal is automatically switched, can be attained by the small size optical pick up, when the hologram laser unit is utilized.

As described above, in the optical disc reproducing device in accordance with the second embodiment, the elements of the photodetector is divided into two along the radial direction, and one of the divided two is further divided along the radial direction of the optical disc and the other is divided into two along the tangential direction of the pit string. Therefore, the arrangement is suitable for reduction in size of the component to be incorporated in the hologram laser unit.

EIGHTH EMBODIMENT

The eighth embodiment of the present invention will be described with reference to FIG. 18.

As in the sixth embodiment, in the present embodiment, the photodetector having four elements divided along the tangential direction of the pit string and the radial direction of the optical disc is used. In the present embodiment, not the phase difference method but the push-pull method is used to generate the tracking servo signal.

Figure 18:
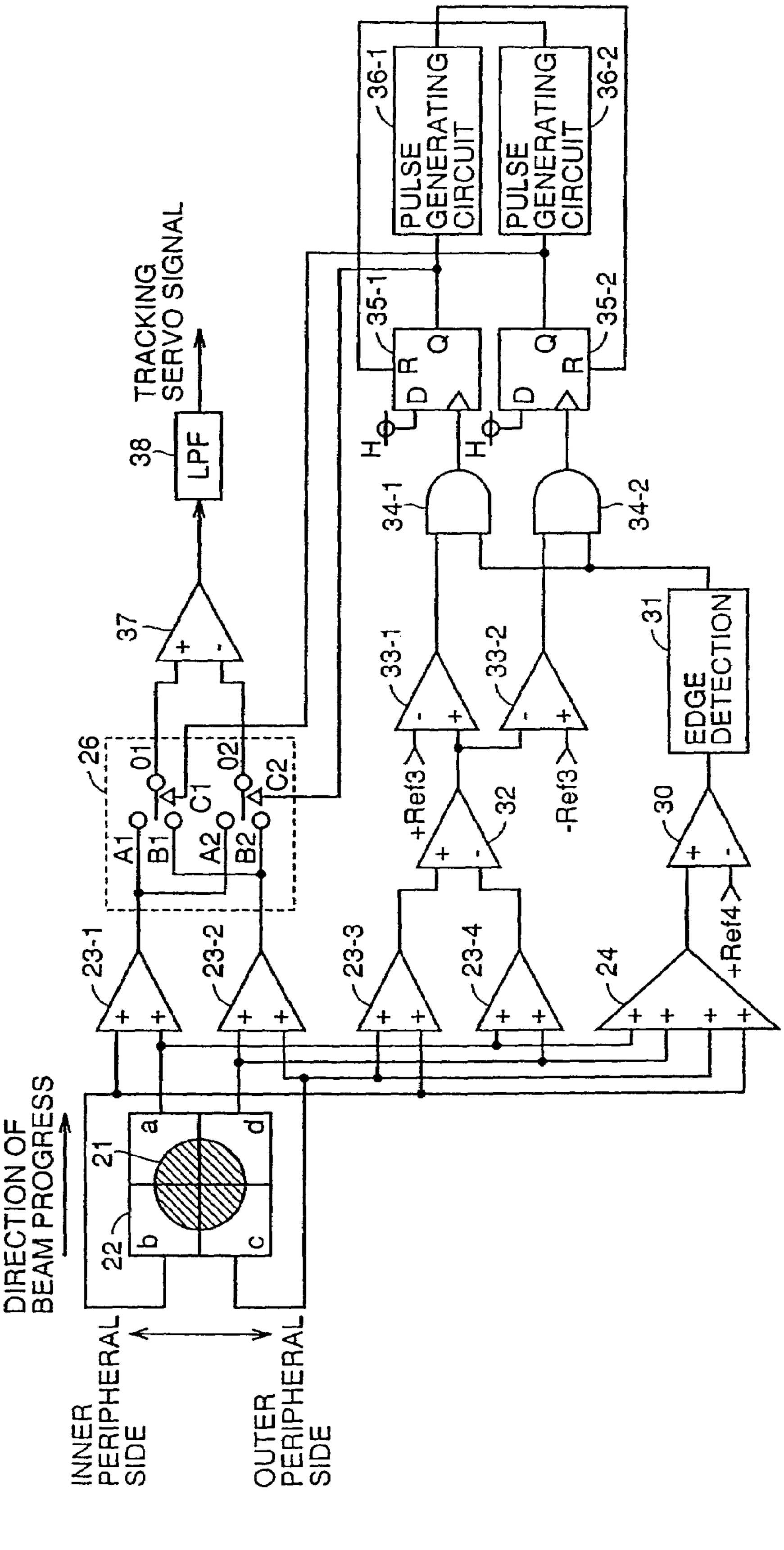
FIG. 18 is a block diagram showing a circuit configuration of an optical disc reproducing device in accordance with the eighth embodiment of the present invention.

In FIG. 18, the tangential push-pull signal and the total sum signal of the quantity of the reflected light are calculated, the depth of the pit is detected and determined based thereon and switch 26 is switched, in the similar manner as in the sixth embodiment. The operation is also the same.

In the present embodiment, push-pull method is adopted to generate the tracking servo signal, as described above. In the push-pull method, the reflected light of the light beam is divided into the inner peripheral side and the outer peripheral side of the optical disc, intensity difference therebetween is calculated and the difference is used as the tracking servo signal.

For this purpose, in FIG. 18, the sum of the outputs from elements a and b receiving components of the reflected light of the inner peripheral side of the optical disc is calculated by sum amplifier 23-1, and the sum of outputs from elements c and d receiving the components of the reflected light on the outer peripheral side of the optical disc is calculated by sum amplifier 23-2. The difference in output amplitudes of these is calculated by differential amplifier 37. The result of subtraction has its low frequency component extracted by LPF 38, and the result is provided as the tracking servo signal.

Switch 26 is switched in accordance with the depth of the detected pit depth. In FIG. 18, the polarity is switched when outputs of sum amplifiers 23-1 and 23-2 are connected to differential amplifier 37. An inversion amplifier may separately be provided at an output of differential amplifier 37, and one of the outputs of the amplifier and the differential amplifier 37 may be switched to provide the tracking servo signal.

As described above, as the tracking servo signal is generated by the push-pull method in the present embodiment, it becomes possible to generate the tracking servo signal even in an optical disc having not only pit strings but also grooves, which are continues guide grooves.

NINTH EMBODIMENT

The ninth embodiment of the present invention will be described with reference to FIG. 19.

In the present embodiment, as in the seventh embodiment, a photodetector 22*a* incorporated in the hologram laser unit is used. For generating the tracking servo signal, push-pull method is applied, as in the eighth embodiment.

Figure 19:
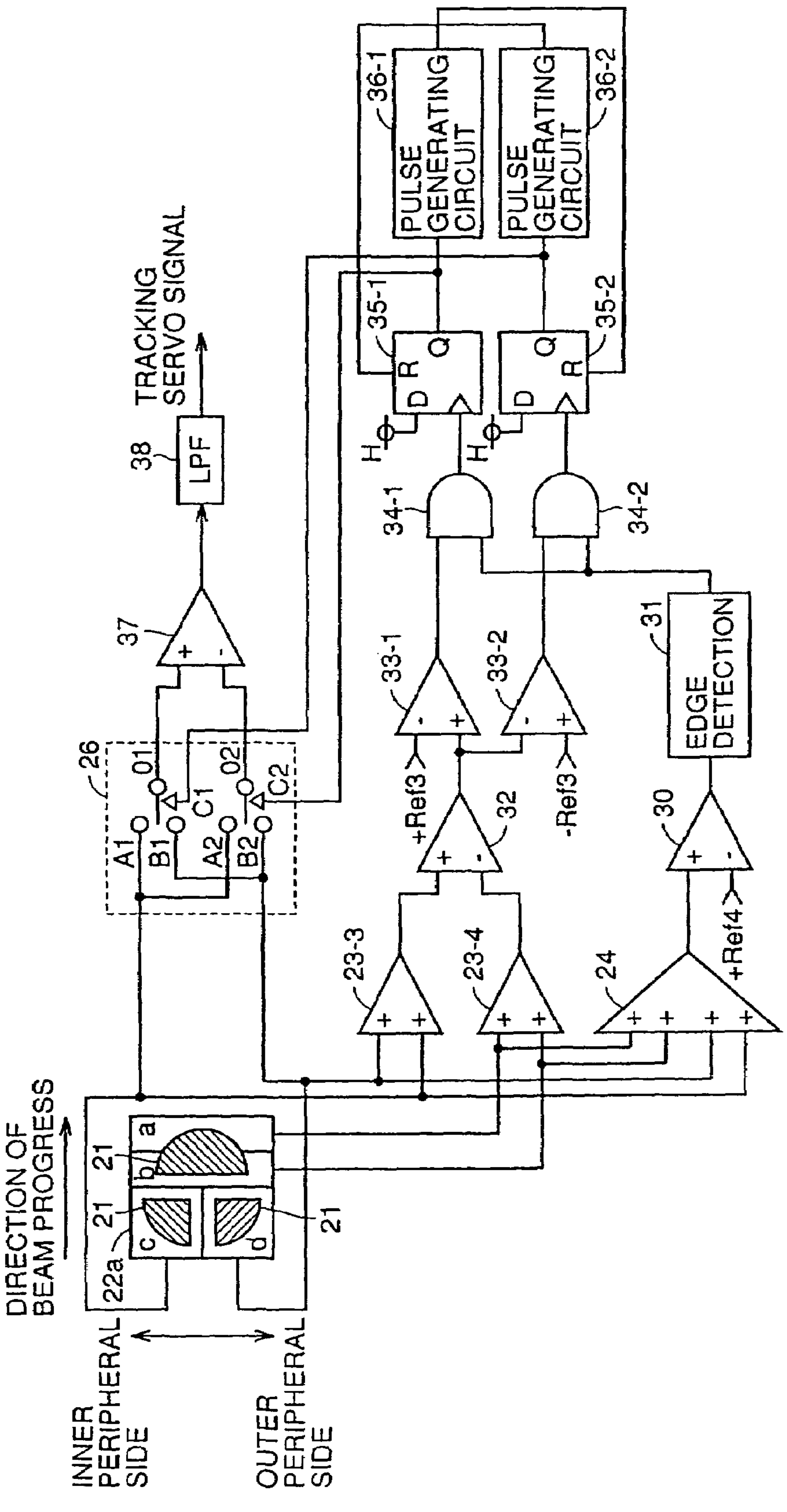
FIG. 19 is a block diagram showing a circuit configuration of an optical disc reproducing device in accordance with the ninth embodiment of the present invention.

Referring to FIG. 19, connections and operations of portions for obtaining the tangential push-pull signal and the signal corresponding to the amount of reflected light and for detecting the pit depth such as photodetector 22*a*, sum amplifiers 23-3, 23-4 and 24 as well as the subsequent circuits are the same as in the seventh embodiment.

What is difference is the connection of elements c and d of photodetector 22*a*. Namely, the elements are connected through switch 26 to differential amplifier 37, so that the difference in amplitude of the outputs is calculated.

As already described with reference to the eighth embodiment, in the push-pull method, the reflected light of the beam is divided to the inner peripheral side and the outer peripheral side of the optical disc, and intensity difference is calculated and used as the tracking servo signal. As already described with reference to the seventh embodiment, elements c and d receive light corresponding to the latter half of the reflected light. As these elements are arranged to receive the light from the inner peripheral side and the outer peripheral side of the optical disc, respectively, it is possible to obtain the tracking servo signal by the push-pull method as in the photodetector 22 having the configuration shown in FIG. 14 or 18, by calculating the difference between the outputs of elements c and d.

In this embodiment, switch 26 switches between the outputs of elements c and d and applies the switch output to differential amplifier 37, so as to switch the polarity of the tracking servo signal. Alternatively, an inversion amplifier may be provided for switching between the output of differential amplifier 37.

As already described in the sixth embodiment, the present invention utilizes the fact that the direction of diffraction of the light reflected from the pit and hence intensity distribution differ dependent on the depth of the pit, especially the fact that inversion occurs at ($\lambda$/4n) where $\lambda$ represents the wavelength of the light used (light beam directed to the optical disc) and n represents the index of refraction of the substrate of the optical disc. Though not separately identified, this is the common principle in any of the embodiments.

The depth at which inversion of the direction of diffraction occurs is not limited to ($\lambda$/4n). Actually, inversion occurs when the depth increases from this reference value by ($\lambda$/2n). Therefore, generally, when the depth of the pit can be classified into groups D1 and D2 satisfying the following relation, the direction of diffraction of the reflected light is inverted between the pits belonging to these groups, and therefore it is possible to detect the depth of the pit and switch the polarity of the tracking servo signal:

$$(k\lambda/2n)<D1<\{(\lambda/4n)+(k\lambda/2n)\} \text{ and}$$

$$\{(\lambda/4n)+(m\lambda/2n)\}<D2<\{(m+1)\cdot\lambda/2n\}$$

where $\lambda$ represents the wavelength of the light beam, n represents the index of refraction of the substrate of the optical disc, and k and m represent arbitrary integers.

Therefore, in manufacturing the optical disc, when there is some condition such as a certain pit depth facilitating manufacturing, then the values k and m may be selected to satisfy such a condition. The values k and m may not be the same. Therefore, the degree of freedom in selecting the pit depth is high.

Generally, manufacturing is easier if the pit depth is minimum. Further, it is said that shallower pits provide better quality of the reproduced signal. Therefore, at least one of k and m may be set to 0.

As described above, in the optical disc reproducing device in accordance with the ninth embodiment, it becomes possible to determine the depth of the pit suitable for the manufacturing conditions of the optical disc by selecting appropriate integers as k and m mentioned above. Therefore, the degree of freedom in selecting the pit depth is high.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc reproducing device reproducing an optical disc having pits of at least two different depths formed therein, comprising:

a photoreceptor element detecting a light beam reflected from said optical disc;

a pit depth detecting unit detecting depth of the pit formed on said optical disc based on the quantity of the reflected light beam detected by said photoreceptor element;

a servo signal generating unit generating a tracking servo signal based on the quantity of the reflected light beam detected by said photoreceptor element; and a polarity inverting unit inverting polarity of the tracking servo signal generated by said servo signal generating unit based on the result of detection by said pit depth detecting unit;

wherein said pit depth detecting unit includes a first detecting unit detecting a first signal based on the quantity of reflected light beam from said optical disc;

a second detecting unit detecting a second signal indicative of the difference in intensity distribution of the reflected light beam along the tangential direction of the pit string on said optical disc, and a third detecting unit detecting the depth of the pit formed in said optical disc based on the first signal detected by said first detecting unit and the second signal detected by said second detecting unit; and wherein said third detecting unit includes a first comparing circuit comparing the second signal detected by said second detecting unit with a first reference value, a second comparing circuit comparing the second signal detected by said second detecting unit with a second reference value, and a flip-flop circuit holding the result of comparison by said first comparing circuit and the result of comparison by said second comparing circuit, at a point of transition of the first signal output from said first detecting unit.

2. An optical disc reproducing device reproducing an optical disc having pits of at least two different depths formed therein, comprising:

a photoreceptor element detecting a light beam reflected from said optical disc;

a pit depth detecting unit detecting depth of the pit formed on said optical disc based on the quantity of the reflected light beam detected by said photoreceptor element;

a servo signal generating unit generating a tracking servo signal based on the quantity of the reflected light beam detected by said photoreceptor element; and a polarity inverting unit inverting polarity of the tracking servo signal generated by said servo signal generating unit based on the result of detection by said pit depth detecting unit;

wherein said photoreceptor element includes a first element and a second element divided along the radial direction of said optical disc, said first element includes a third element and a fourth element divided along the radial direction of said optical disc, and said second element includes a fifth element and a sixth element divided along the tangential direction of the pit string.

* * * * *